United States Patent
Heronemus et al.

(10) Patent No.: US 7,075,189 B2
(45) Date of Patent: Jul. 11, 2006

(54) OFFSHORE WIND TURBINE WITH MULTIPLE WIND ROTORS AND FLOATING SYSTEM

(75) Inventors: William Heronemus, deceased, late of Amherst, MA (US); by Phyllis R. Heronemus, legal representative, Amherst, MA (US)

(73) Assignee: Ocean Wind Energy Systems, Newton, MA (US)

(*) Notice: Subject to any disclaimer, the term of this patent is extended or adjusted under 35 U.S.C. 154(b) by 358 days.

(21) Appl. No.: 10/384,318

(22) Filed: Mar. 7, 2003

(65) Prior Publication Data

US 2003/0168864 A1 Sep. 11, 2003

Related U.S. Application Data

(60) Provisional application No. 60/362,790, filed on Mar. 8, 2002.

(51) Int. Cl.
*F03D 9/00* (2006.01)
*H02P 9/04* (2006.01)
*F03B 13/00* (2006.01)

(52) U.S. Cl. .............................. 290/44; 290/55; 290/54
(58) Field of Classification Search .................. 290/43, 290/44, 54, 55; 415/907, 7, 2.1, 4.2; 416/7, 416/11

See application file for complete search history.

(56) References Cited

U.S. PATENT DOCUMENTS 4,058,979 A * 11/1977 Germain ...................... 60/327
4,110,631 A * 8/1978 Salter .......................... 290/55

(Continued)

FOREIGN PATENT DOCUMENTS

| CH | 638148 | 9/1983 |
|---|---|---|
| DE | 19744174 | 4/1999 |
| DE | WO 01/34977 A1 * | 5/2001 |
| DE | 10055973 | 5/2002 |
| DE | 10106208 | 9/2002 |
| WO | WO 03/004869 | 1/2003 |

OTHER PUBLICATIONS

Henderson, Patel, Floating Offshore Wind Energy, Proceedings of the 20th BWEA Annual Conference, 1998.
Soker, Rehfeldt, Santjer, Strack, Schreiber, Offshore Wind Energy in the North Sea, Oct. 2002, see pp. 35–41.

(Continued)

*Primary Examiner*—Darren Schuberg
*Assistant Examiner*—Julio Cesar Gonzalez Ramirez

(57) ABSTRACT

A wind energy conversion system optimized for offshore application. Each wind turbine includes a semi-submersible hull with ballast weight that is moveable to increase the system's stability. Each wind turbine has an array of rotors distributed on a tower to distribute weight and loads and to improve power production performance where windshear is high. As much of the equipment associated with each rotor as possible is located at the base of the tower to lower the metacentric height. The equipment that may be emplaced at the bottom of the tower could include a power electronic converter, a DC to AC converter, or the entire generator with a mechanical linkage transmitting power from each rotor to the base of the tower. Rather than transmitting electrical power back to shore, it is contemplated to create energy intensive hydrogen-based products at the base of the wind turbine. Alternatively, there could be a central factory ship that utilizes the power produced by a plurality of wind turbines to create a hydrogen-based fuel. The hydrogen based fuel is transported to land and sold into existing markets as a value-added "green" product.

3 Claims, 22 Drawing Sheets

U.S. PATENT DOCUMENTS

| | | | | |
|---|---|---|---|---|
| 4,159,427 | A | * | 6/1979 | Wiedemann ................ 290/55 |
| RE30,590 | E | * | 4/1981 | Blenkarn .................... 114/265 |
| 4,291,233 | A | * | 9/1981 | Kirschbaum ............... 290/1 C |
| 4,498,017 | A | * | 2/1985 | Parkins ....................... 290/44 |
| 4,776,171 | A |   | 10/1988 | Perry, Jr. et al. |
| 4,966,525 | A | * | 10/1990 | Nielsen ......................... 416/9 |
| 4,993,348 | A |   | 2/1991 | Wald |
| 5,254,876 | A | * | 10/1993 | Hickey ........................ 290/55 |
| 5,289,041 | A | * | 2/1994 | Holley ......................... 290/44 |
| 5,476,293 | A | * | 12/1995 | Yang ........................... 290/4 C |
| 5,876,181 | A | * | 3/1999 | Shin ............................ 415/2.1 |
| 6,091,161 | A | * | 7/2000 | Dehlsen et al. ............. 290/43 |
| 6,100,600 | A | * | 8/2000 | Pflanz ......................... 290/54 |
| 6,270,308 | B1 | * | 8/2001 | Groppel ...................... 415/4.3 |
| 6,294,844 | B1 | * | 9/2001 | Lagerwey .................... 290/55 |
| 6,320,273 | B1 | * | 11/2001 | Nemec ........................ 290/55 |
| 6,400,039 | B1 | * | 6/2002 | Wobben ...................... 290/44 |
| 6,479,907 | B1 | * | 11/2002 | Eriksson et al. ............. 290/44 |
| 6,676,122 | B1 | * | 1/2004 | Wobben ...................... 290/55 |
| 2002/0192068 | A1 | * | 12/2002 | Selsam ........................ 415/3.1 |
| 2004/0169376 | A1 | * | 9/2004 | Ruer et al. ................... 290/55 |

OTHER PUBLICATIONS

Henderson, Patel, On theModelling of a Floating Offshore Wind Turbine, Wind Energy, Feb. 2003.

Tong, Quarton, Standing, FLOAT—A Floating Offshore Wind Turbine System, Proceedings of the 15th BWEA Annual Conference, 1993, pp. 407–413.

* cited by examiner

OFFSHORE WIND TURBINE WITH MULTIPLE WIND ROTORS AND FLOATING SYSTEM

RELATED APPLICATIONS

This application claims priority under 35 U.S.C. § 119(e) to U.S. Provisional Patent Application No. 60/362,790 which was filed on Mar. 8, 2002 and which is incorporated herein by reference.

FIELD OF THE INVENTION

Embodiments of the invention relate to improvements in the field of wind power conversion systems. They further relate to summation of power output from multiple wind turbine rotors or other power sources. They further relate to the use of renewable energy, such as wind, used to create hydrogen gas. They further relate to using this hydrogen gas to create hydrogen-derivative fuels. Also, they encompass the mechanical marine systems used to support and maintain the wind turbines at sea and to transport the hydrogen and hydrogen-derivative fuels to land.

BACKGROUND OF THE INVENTION

Wind turbines have begun to be sited at offshore locations. The use of wind turbines to generate electricity offshore presents some unique challenges that are not encountered onshore. This includes, among other things, the provision of a seaworthy foundation or platform for the turbine, and the construction of the wind turbine tower and placement of the wind turbine aloft on the tower as well as the transmission of energy generated to shore. In prior art offshore wind turbines, a solid foundation is poured with pilings into the sea floor and the tower is erected on this foundation with the use of large and complicated sea cranes which also are used to put the nacelle and rotor aloft on the tower. Offshore turbines installed in this manner must be placed in relatively shallow water so that the foundation is not excessively tall and expensive and they can only be erected when weather conditions are suitable for operating the sea crane. It would be desirable to provide a method of installing offshore wind turbines in deep waters which would allow the wind turbine to be assembled in an area near shore where it is protected from severe weather.

Conventional offshore wind turbine foundations and pilings are a significant impact to the sea floor ecology and at the end of the turbine's life the foundation may present a navigation hazard. It would be desirable to provide a way of deploying offshore wind turbines that have a lower impact on sea floor ecology and do not present a navigation hazard after the turbine is decommissioned.

Prior art offshore wind farms most commonly collect the output from each of the wind turbines and step the voltage up to high voltage for transmission to shore via an electric cable. The cost of this transmission system can be prohibitively large especially if the wind farm is very far from shore. It would be advantageous to provide an alternate method for transmitting the energy produced by the wind turbines. The placement of these prior art turbines offshore, but near land, has caused controversy because the turbines are easily visible from populated areas. By placing the turbines far offshore the visual impact is lessened and the permitting will be easier. This is because the offshore structure becomes much less visible if it is placed at least 12 miles from shore.

There has been some research into using excess wind power or remote wind power to produce hydrogen which could be used in a fuel cell to provide peaking power. Since there is not much infrastructure for transmission and use of hydrogen, any hydrogen produced must be used at the site or packaged for safe transportation. Furthermore, new infrastructure must be adopted by society at large before there will be a significant market for hydrogen. It would be desirable to provide a method for allowing the products of excess wind energy or remote wind energy to be used directly in the existing chemical fuel infrastructure.

There is currently a growing market for "green power" sold at a premium price by some utilities and "green tags" which represent the environmental attributes of green power and are available for purchase where the local utility does not have a "green power" pricing program. This demonstrates that many consumers want to purchase electricity which has been produced in an environmentally friendly way, and that they are willing to pay a premium price for this product. The market for chemical fuels (gasoline, natural gas, etc) currently has no equivalent, with the possible exception of biodiesel fuel. It would be desirable to provide environmentally friendly chemical fuels to the marketplace where they could be marketed at a premium price to environmentally conscious consumers.

In prior art groupings of wind turbines, usually in the form of an onshore wind farm, grid quality AC power is produced in the nacelle of each wind turbine, in phase with each other, and all the power is summed through a common transformer of substation and delivered to the utility grid. Although effective, this requires that each of the turbines have all equipment necessary to produce grid quality AC power including gearbox and generator, and possibly a power converter. Often this equipment is heavy and located in a nacelle at the top of a tower which raises the center of gravity of the whole tower, turbine, and foundation system increasing the demands on the tower and foundation. It would be desirable to provide a method of summing power such that more equipment could be located at the base of a tower and such that many turbine rotors could share one set of equipment.

SUMMARY OF THE INVENTION

The windships of the present invention provide submersible hulls in the ocean or other body of water. The wind resource above such large bodies of water tends to be greater and steadier than over land, thus it is attractive to find practical ways of placing wind turbines in such locations and effectively using or transmitting the energy produced. A windship can support a wind turbine or an array of wind turbines, and optionally the support equipment to produce hydrogen-based fuels at sea from wind power. The windships in this disclosure are floating stable structures of reinforced concrete, steel, fiberglass or other suitable material. The hulls use technology similar to submarine technology to provide variable ballast mass and position to resist overturning moments and to dampen heaving caused by wave and tidal action by making the appropriate buoyancy and ballast corrections. The type of hull is semi-submersible, and provides very stable offshore platforms even in heavy weather conditions. Hulls may differ in size and design whether sited in shallow water, deep water, or far at sea.

The hulls must also be able to accommodate various sizes of wind turbines and/or wind turbine arrays, and be used in extreme weather, tidal, current, and wave action. Such a vessel which supports wind turbines and/or uses offshore wind power to produce some energy intensive product such as hydrogen or desalinated water is referred to as a 'windship' or collectively as 'windships' in this disclosure. This technology is similar to long-term stable marine platforms used in the oil and natural gas industries, since these platforms also use the semi-submersible conceptual approach but with different naval architectures. One approach used on present offshore oil and gas platforms, that is in common with the present invention, is providing small waterline area. In oil and gas platforms this is done using support pylons, which contain ballast, to support the above water structure.

Windships in relatively deep water are tethered to a large anchor. Thus the windship is always within a circle (called a watch circle) determined by the tether length and centered on a point directly above the anchor. The tether is attached to the windward side of the windship such that during periods of operating winds when the windship is at a point on the leeward side of the circumference of the circle, the tether pulling on the upwind side of the windship keeps the windship oriented toward the wind. In this way a mechanical yaw system is not necessary for deep water windships. In conditions of changing winds where the windship is not yet at the leeward side of the circle or if a significant current is influencing the position of the windship the rotors on opposite sides of the windship (in the case where the windship supports an array of turbines) may be operated to produce differential aerodynamic forces and therefore a net yawing moment. In this way, the windship's yaw angle may be controlled without the need for a yaw motor and bearing as is used in a prior art wind turbine.

Various embodiments of vertical array windship towers have some design aspects in common with each other: the turbine weights and loads are evenly distributed over the space frame; the central tower pylon and its base are conventional vertical truss or tube designs; and all the tower loads are taken into this central pylon and then into the tower base and foundation or submersible hull. The windship towers may have no yawing degree of freedom, whereas this feature is necessary for land-based vertical arrays. A description of a yaw system for a land-based array of wind turbine rotors is given in copending U.S. patent application Ser. No. 10/092,775 entitled Vertical Array Wind Turbine the teachings of which are incorporated herein by reference. The yaw system described in U.S. patent application Ser. No. 10/092,775 may be used for windships situated in shallow water locations with stationary hulls.

The vertical array support structures are tailored to a unique loading specification. Vertical array windship towers have distributed loading, wherein the loads imposed on the tower by the wind turbine rotors are spread out appropriately on the entire structure. In prior art wind turbine towers these loads are concentrated on the top. If the loads are smaller and spread out, the design of the support is very different from a prior art wind turbine tower. A parallel exists in the utility industry where very large towers are built to hold and carry widely spaced high voltage cables. These utility towers have at most twelve hard points where the cables are secured. These are widely spaced to provide clearance between the cables. In a windship tower, the same idea is carried forward to allow many evenly spaced hard points for each wind turbine in the vertical array. Unlike the utility towers, the windship towers have fixed hard points whose spacing is determined by the rotor diameter of the turbines, and not determined by rare extreme events in heavy weather which is the case for high voltage cables. This even spacing of the "hard points" on the windship tower allows the even spacing of the weight and aerodynamic loads of each rotor on the tower structure. When this is done, the tower frame design results in much lower weight and cost than prior art towers. Many practical methods of building a windship tower are conceivable such as using a truss structure, a monocoque tubular tower, or a cable stiffened structure.

Embodiments of the present invention also provide methods for using the electricity generated by the wind turbines to create hydrogen and hydrogen-based fuels via electrolyzers. These fuels can be transported back onshore. Some possible fuels are forms of hydrogen, either liquid or gaseous, which can be used directly in fuel cells or some vehicles, or hydrogen stored in a benign storage medium such as anhydrous salts or catalytic metal wool. Other fuels are based on hydrogen, but are chemically transformed into nitrogen- or carbon-based compounds. Nitrogen gas from seawater or the atmosphere is combined with hydrogen gas in a "burner" which produces ammonia, which can then be processed into anhydrous ammonia. This anhydrous ammonia is being used worldwide as a synthetic fertilizer but can also be used as a fuel, and is easy to store and transport. Carbon reclaimed from seawater or the atmosphere via cracking of carbon dioxide, is similarly combined with hydrogen to produce methane or "green gas". This renewably derived methane can be directly injected into the network of natural gas pipelines or can be used in the creation of other synthetic fuels that can be marketed as an environmentally friendly fuel. While this specification describes the production of hydrogen and hydrogen-based products in the context of an offshore wind turbine, it is to be understood that these methods may be practiced onshore and they may be utilized with conventional prior-art wind turbines. The production of "green gas" may even be achieved using a source of renewable energy other than wind energy, such as solar or geothermal.

Embodiments of the present invention also include methods for summing the power output from multiple wind turbine rotors, either electrically or mechanically. By summing the power from individual rotors as disclosed herein it is possible to decrease the weight located at the turbine hub and relocate the weight to the bottom of the tower thus reducing the structural requirements of the tower and the ballast requirements of the hull. The embodiments of power summation techniques described herein are useful for arrays of wind turbines located on land as well as offshore.

BRIEF DESCRIPTION OF THE DRAWINGS

Features and advantages according to embodiments of the invention will be apparent from the following Detailed Description taken in conjunction with the accompanying drawings, in which.

DETAILED DESCRIPTION OF THE INVENTION

In the following disclosure several embodiments of the invention are described to give illustrate (but not limit) the extent and usefulness of the invention. The term 'wind turbine' is used herein to describe the prime mover portion of a wind power production system and describes the aloft, non-tower, portions of the wind power production system. The term 'wind turbine' encompasses the drive train, gearbox, and generator for embodiments that include these elements. The word 'rotor' refers to the external rotating parts of a wind turbine, namely blades and a hub. As noted previously the word 'windship' is used herein to describe an offshore semi-submersible marine wind power system and the support structure for said system.

Figure 1:
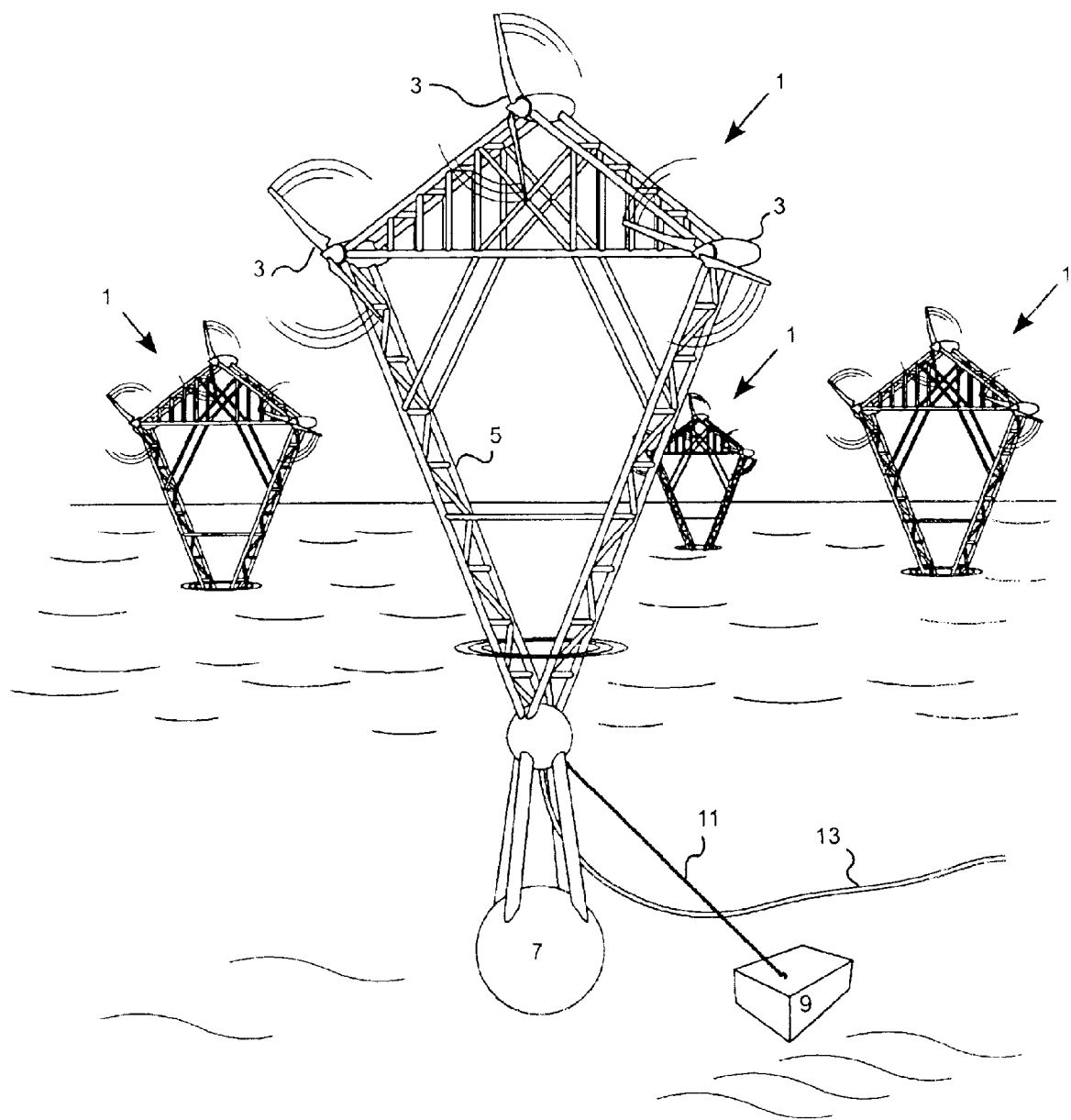
FIG. 1 is a perspective view of windship according to an embodiment of the present invention.

FIG. 1 shows four arrays of wind turbines 3, three to a tower 5, mounted at sea on windships 1 which are tethered to the seabed via anchors 9. In the foreground of FIG. 1 is an offshore wind turbine in the form of a windship 1 using three large rotors 3, moored at sea on a windship semi-submersible hull 7, in a flotilla with other windships 1. As shown in FIG. 1 the present invention includes a plurality of wind turbine rotors 3 placed on a tower 5 which is supported by a semi-submersible hull 7. The rotors 3 are arranged in an array and each rotor is optimized for the wind speed that it experiences at its position. The windship 1 is attached to an anchor 9 by a tether 11. Electrical power may be transmitted from the windship 1 via a power cable 13. The power cable 13 may lead to an onshore collection point or a central collection point located offshore where power from multiple windships 1 is aggregated and transmitted onshore. The power cable 13 may also lead to a central processing plant associated with the flotilla of windships 1 where the electrical power is used to synthesize hydrogen or a hydrogen-based product that can be transported onshore.

Windships use a mooring cable 11 attached to an anchor 9. The anchor 9 must be heavy enough to secure the windship under every conceivable load condition including high storm situations. The mooring allows motion of the windship 1 in order to align itself with the local currents and winds. The "train" angle of the cable is a combination of the strength of the local surface current and the wind load induced by the wind turbines. This can be seen in FIG. 1 where the windship employs downwind rotors 3. For the vertical wind turbine array illustrated in FIG. 1, a yawing moment can also be produced by controlling the outboard rotors in the array to produce differential aerodynamic forces between the two sides producing a net yawing moment. The differential aerodynamic forces are produced by altering blade pitch or speed or both. This additional yawing moment can be used to further stabilize the windships from adverse yawing moments produced by surface currents or in transient situations. When the wind changes direction, which happens less randomly and with less turbulence at sea compared to on land, the entire structure trains downwind on the sea surface. The mooring cable must have enough scope to allow unobstructed training of the windship throughout the windship's entire watch circle. This freedom of motion on the sea surface eliminates the need for a yaw drive for the turbines.

A more detailed discussion of yawing dynamics is appropriate at this point, because this issue is different for a windship with an array of rotors than it is for a prior art land-based wind turbine. If all of the rotors at a given height in the array have similar operating conditions (primarily the same pitch angle and rotor speed) and they are generating their optimum power, then the distribution of thrust forces over the array is evenly distributed, all of the thrust vectors point downwind, and there is no net yaw moment. If the wind changes direction slightly, then the rotors will all have a crosswind component in addition to the axial thrust component. The crosswind forces produce an inplane force at each rotor that is perpendicular to the axial thrust and in the direction of the crosswind flow. For a downwind rotor or array (downwind of the tower) the crosswind force acts as a restoring moment causing the system to yaw into the new wind direction. Even for an upwind rotor or array the crosswind force can act as a restoring moment as evidenced by experience with upwind turbines in commercial windfarms acting stably with malfunctioning or missing yaw drives. Secondary aerodynamic and dynamic effects due to turbulence, wind shear, gyroscopic forces, rotor dynamics, and other factors can act to destabilize a wind turbine and yaw it out of the wind, which is why most commercially available wind turbines employ an active yaw drive. For a windship, it is not a simple matter to incorporate an active mechanical yaw drive and it would be preferable to find another method for providing yaw control and yaw stability. This can be accomplished by modifying the aerodynamic characteristics of the outboard rotors. By adjusting the pitch angle and/or rotor speed of the outboard rotors it is possible to modulate the axial thrust on those rotors at will. By increasing the axial thrust force on one outboard rotor and/or reducing the axial thrust force on the opposite rotor it is possible to create a differential in axial thrust forces from one side of the array to the other. The differential in thrust force multiplied by the width of the array divided by two gives the net yaw moment on the windship. The aerodynamic thrust force can be modulated on as many rotors as needed to achieve a sufficient yaw moment to orient the windship into the wind direction. For instance, in an array of 12 rotors it may only be necessary to modulate the thrust force on two of the outboard rotors whereas for an array of 36 rotors it may be necessary to modulate the thrust force on 4, 6, or even 8 rotors to achieve a sufficient yaw moment. Note that even in completely calm wind conditions it is still possible to develop a net yaw moment by providing power to the outboard rotors and motoring them. A yaw vane should be provided at the top of the tower or at the top of the array of wind turbines. The wind vane can be used to provide an input signal to a yaw controller which in turn provides command signals to the appropriate rotors to modulate their pitch angle or rotor speed, thereby modulating those rotors' thrust forces. The operation of the yaw vane and controller would be similar to that of a prior art land-based wind turbine with active yaw control. In the case of a small array of only three wind turbines, or even for a windship with a single rotor, it is possible to provide a net yaw moment by cyclically pitching the blades on one or more rotor. The cyclic pitch provides differential aerodynamic forces on the two sides of the rotor thereby creating a yaw moment. This is analogous to steering control on a helicopter which is achieved through cyclic pitch.

Details of the wind turbine 3 and the tower 5 are similar to the wind turbine described in copending U.S. patent application Ser. No. 10/092,775 entitled Vertical Array Wind Turbine, the teachings of which are incorporated herein by reference.

Design of wind turbines and wind turbine rotors is not a simple matter. There are many complex issues to address regarding loads, materials, structural dynamics, aerodynamics, controls, and power conversion. One of ordinary skill in the art would be able to design the wind turbines required for the windship disclosed herein, although attention to detail in the design is very important. Guidance for wind turbine design may be found in the following references, all of which are incorporated herein by reference:

Guidelines for Design of Wind Turbines, Det Norske Veritas, Copenhagen and Riso National Laboratory, Denmark, 2002.

Hau, E., Windturbines—Fundamentals, Technologies, Application, and Economics, Springer Verlag, Berlin Heidelberg, 2000.

Eggleston, D., Stoddard, F., Wind Turbine Engineering Design, Van Nostrand Reinhold, New York, 1987.

Burton, T., Sharpe, D., Jenkins, N., Bossanyi, E., Wind Energy Handbook, John Wiley & Sons, West Sussex England, 2001.

Gasch, R., Twele, J., Wind Power Plants—Fundamentals, Design, Construction, and Operation, Solarpraxis AG, Germany, 2002.

Freris, L., Wind Energy Conversion Systems, Prentice Hall International Ltd., London, 1990.

In particular, one must pay special attention to design of offshore wind turbines. These wind turbines have unique design considerations related to wave loading, dynamics that are different from onshore turbines, corrosion due to a salt-water environment, and other factors. Special chapters on design of offshore wind turbines can be found in Chapter 13 of the above reference entitled Wind Power Plants—Fundamentals, Design, Construction, and Operation and Chapter 16.6 of the above reference entitled Windturbines—Fundamentals, Technologies, Application, and Economics. The design of wind turbine rotors for a windship differs from land-based wind turbines in that the load specification will be somewhat different. As the windship tilts backward and forward, the relative windspeed that each rotor "sees" varies. This dependence of aerodynamic loads on windship dynamics must be considered when designing the rotors. The behavior is analogous to a highly flexible rotor on a land-based wind turbine. Calculation of the design loads is within the capability of one of ordinary skill in the art.

Figure 6:
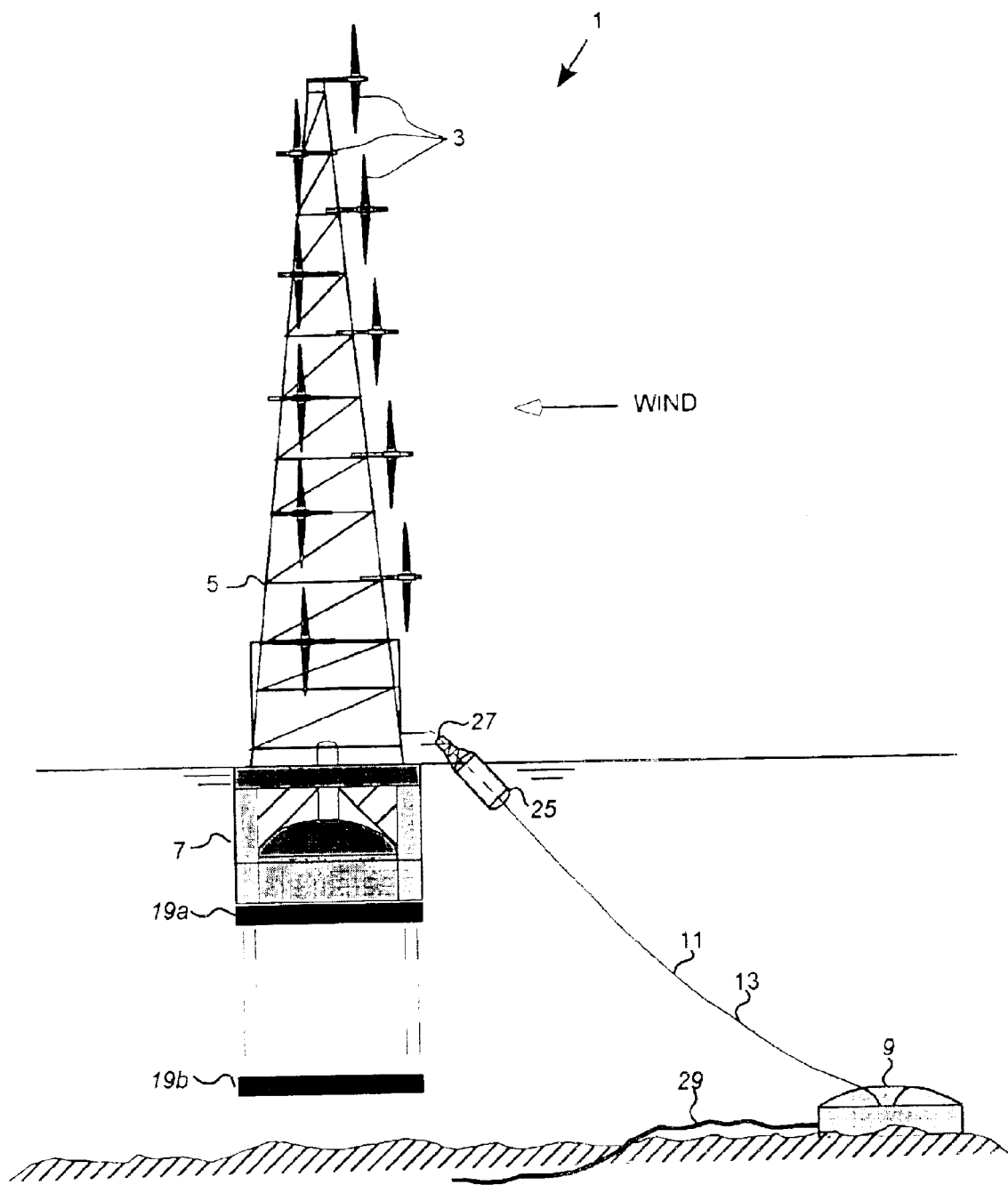
FIG. 6 is a side view of a windship according to an embodiment of the present invention.

The mooring cable 11 experiences a vertical force vector and a horizontal force vector. The distribution of these components with depth determines the shape of the mooring cable 11. The vertical force component is due to the weight of the mooring cable 11 and the dynamic (both random and periodic) heaving of the windship. The vertical forces can be ultimately destabilizing to the windship hull 7. Therefore, it can be desirable in certain conditions to include a mooring buoy between the windship and the mooring cable 11 as shown in FIG. 6. If a mooring buoy is employed, it acts to lift the mooring cable 11 and remove the vertical forces that would otherwise act on the hull 7 of the windship. The horizontal vector of force on the mooring cable 11 acts to restrain the windship within a watch circle around the anchor 9. The horizontal force is due to a combination of the net downwind aerodynamic forces on the wind turbines, the downwind drag on the tower and other aloft components of the windship, the crosswind aerodynamic forces on the wind turbines, the net thrust on the hull 7 and any other subsurface structures due to currents and surface wave trains, and any additional forces due to ice loading, maintenance ship visits, etc. The horizontal force on the mooring cable has a corresponding reaction force acting on the hull 7 of the windship. It is important to properly select the attachment point of the mooring cable 11 to the hull 7 so that the horizontal restraining force does not destabilize the windship. The attachment point must be selected so that the mooring cable 11 does not introduce a layback moment on the windship. That would happen if the mooring cable 11 were attached to the top or the bottom of the hull 7 so that horizontal forces tend to tip the windship forward or backward. If the mooring cable 11 is attached to the hull 7 somewhere between the center of gravity and the center of buoyancy then it will not create a layback moment. Selection of an appropriate attachment point is within the capability of one of ordinary skill in the art.

With the mooring cable 11 appropriately attached to the hull 7, there will still be a layback moment on the windship due to horizontal forces that are not aligned with the windship's center of gravity. The primary horizontal forces to consider come from aerodynamic loading on the wind turbines and tower above the water line. As the wind speed increases, these forces increase and the windship tilts to an equilibrium position at some layback angle. The distance between the center of buoyancy and the center of gravity determines the restoring moment to counteract the layback moment caused by aerodynamic forces. This is why the ballast weight 19 is moveable vertically. As the wind speed increases, the ballast weight 19 is moved downwardly to create a stabilizing moment on the windship and reduce the layback angle. The rate of tilting back and forth of the layback angle is benign for a windship because the wind turbine rotors make excellent aerodynamic dampers. As the windship tilts forward, the relative windspeed experienced by each wind turbine rotor increases (partly since the oncoming wind vector becomes more closely aligned with the rotor axis thereby providing more usable wind speed to the rotor and thus more thrust) and so the aerodynamic force on the windship increases. As the windship tilts backward, the relative windspeed and aerodynamic forces decrease. Therefore, the aerodynamic forces have an inverse relationship to the tilt rate and provide a stabilizing moment. This is the classic behavior of a damper and serves to make the windship very stable and passive. This is also true for dynamic events such as wind gusts or ocean waves, since the wind turbine rotors when operating act as very effective aerodynamic dampers to dynamic movement of the rotor plane. Calculations show that even for a relatively large windship according to the present invention (a windship including an array of 36 rotors each with a 20 meter rotor diameter and rated at a total of 24 MW) the layback angle is 3.2 degrees in a 125 mile per hour wind. This is where an array of smaller rotors has a great advantage over a comparable single rotor with very large diameter. A calculation for a single rotor with a 104 meter rotor diameter and rated at 2.5 MW on a tall tower on a windship shows a tiltback angle of greater than 15 degrees. This is because the single rotor places all of the horizontal force at the top of the tower whereas the array of smaller rotors distributes the loads much closer to the hull 7. Also, the weight of the rotors in the array are distributed closer to the hull 7 so that the metacentric height and the center of gravity of the windship are much lower for an array of small rotors compared to a single large rotor. A discussion of the stability of floating structures can be found in the following reference which is incorporated herein by reference:

Rawson, K., Tupper, E., *Basic Ship Theory*, American Elsevier Publishing Co., Inc., New York, 1968.

Figure 2:
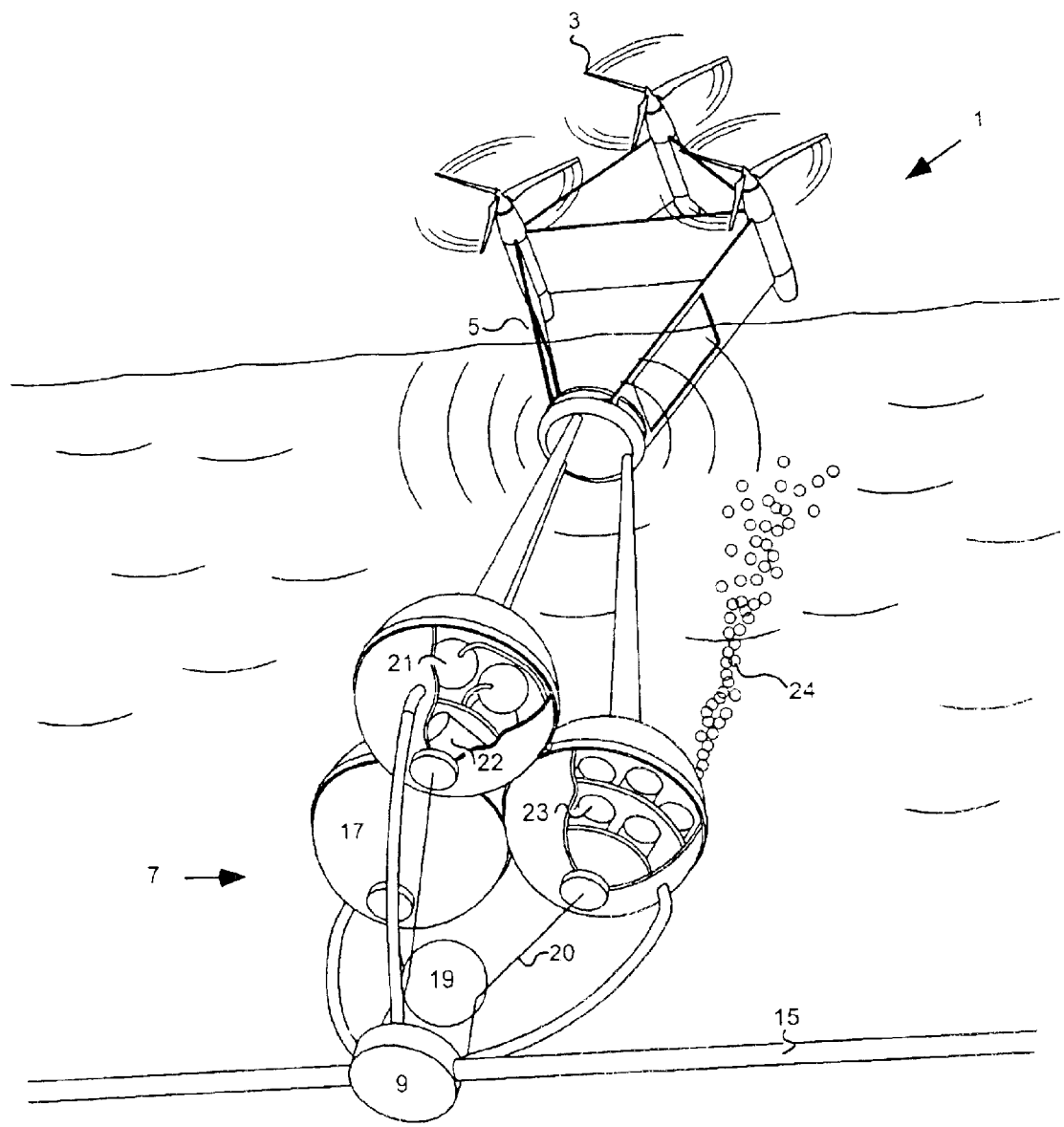
FIG. 2 is a perspective view of windship from under water according to an embodiment of the present invention.

FIG. 2 shows a windship 1 with three rotors 3 looking from an underwater perspective. The windship 1 is producing hydrogen from seawater and delivering the product to an oceanic pipeline 15. Here the anchor 9 is shown to be part of an underwater collection pipeline 15 that transports hydrogen to a central collection point. The hull 7 is shown in FIG. 2 to consist of four parts. There are three buoyant hull spheres 17 that provide positive buoyancy. Underneath the hulls there is a ballast box 19 in the shape of a sphere. The ballast box 19 is filled with rock, concrete, or some other very dense material that provides negative buoyancy. The ballast box 19 is attached to the buoyant hull spheres 17 through a jacking mechanism 20. The jacking mechanism 20 allows the ballast box 19 to be moved and repositioned vertically. Vertical placement of the ballast box 19 provides varying amounts of resistance to overturning moments caused by wind loading on the rotors 3. As the wind speed increases, the ballast box 19 is lowered to counteract the aerodynamic forces on the rotors 3 and reduce the layback angle of the windship 1. Vertical movement of the ballast box 19 also can dampen the heaving, or vertical motion, which the windship 1 experiences as waves pass by. The metacentric height and heeling angle can be adjusted reducing the layback angle in high winds. The semi-submersible design allows a very stable platform in heavy seas, with little rolling and pitching as is also true of conventional ship hull shapes. The semisubmersible hull approach puts relatively less area at the waterline level, making the structure less vulnerable to heavy seas. This approach is used at present on oceanographic vessels to produce a stable inertial platform for experiments and crew safety.

The buoyant hull spheres 17 are hollow and so they can house other equipment. In the embodiment shown, there is a desalinizer 21 that converts ocean water into fresh water. The desalinizer 21 is not required if the windship 1 is deployed in a fresh water body such as the Great Lakes. Fresh water from desalinizer 21 is stored in pure water tanks 22 at the base of the hulls 17. The buoyant hull spheres 17 also include electrolyzer units 23 that convert the pure water into hydrogen and oxygen. The hydrogen is transported through the pipeline 15 to a central storage and distribution location and the oxygen is released as a harmless byproduct, shown in FIG. 2 as bubbles 24 rising from the hull 17. The hydrogen can be piped onshore if the windship is close to a shoreline, or it can be transported to a central processing and storage ship. From the central ship, transport ships can take the hydrogen back to shore where it will be sold and used. Or, instead of electrolyzing seawater in the hull 17 of each individual wind turbine, an electrical umbilical 13 (not shown) can transmit the electricity generated at each windship 1 to a central factory ship. The factory ship uses the electricity to generate hydrogen and hydrogen-based fuels which are later transported back to shore. Other uses for the space in the hollow hulls 17 of windships are conceivable such as living quarters, some other energy intensive industry than that described, a research platform, or any other use suitable for such a space.

Figure 3:
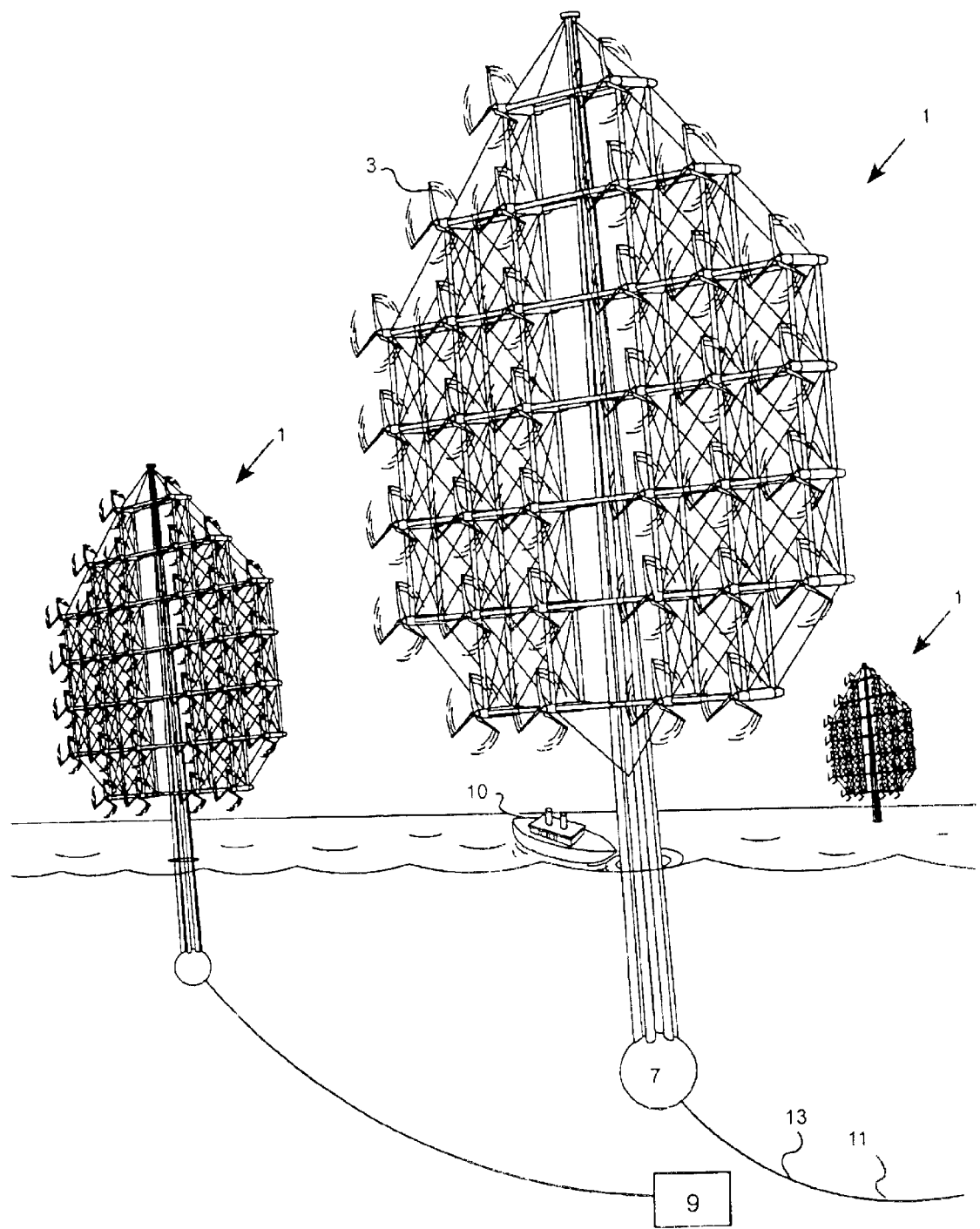
FIG. 3 is a perspective view of a windship according to an embodiment of the present invention.

FIG. 3 shows another embodiment of the present invention in the form of many large array windships 1 with thirty four rotors 3 each, moored at sea and producing hydrogen fuels for transport. This embodiment is similar to those illustrated in FIGS. 1 and 2 except that it includes a much larger array of wind turbine rotors 3, in this case 34 rotors 3 for each windship 1. It is contemplated that each rotor 3 on the windship 1 would be approximately 20 meters in diameter, although the exact rotor size is a design choice that one of ordinary skill in the art may select depending upon site conditions or other criteria. This embodiment allows a much higher rated capacity for each wind turbine array than for a single turbine weighing the same as the aggregate weight of all 34 wind turbines 3. The high rated capacity has economic advantages where the fixed cost of the hull 7, anchor 9, power umbilical 13, and other equipment are high. It should be noted that in this figure and some subsequent figures the power cable 13 and the mooring line 11 are bundled together, although they may be routed separately depending on site conditions and other factors. In this figure a service vessel 10 is approaching a windship 1 for either maintenance, re-supply of reagents, or pick up of products or byproducts produced in the windship 1.

Windships must have different properties for deep water, shallow water, and very deep water but existing naval architecture technology allows for all of these to be built. In deep or continental shelf depth water, the power cable 13 follows the mooring line 11 to the seabed. This cable is laid on or entrenched in the seabed to a collection point where many such cables 13 from the other windships come together. This collection point allows all the cables 13 to surface at a specialized windship called a factory ship. Here the electricity product is used to desalinate and electrolyze seawater to make hydrogen. The factory ship has facilities for producing and storing the hydrogen and hydrogen-derivative fuels that may be produced. The factory ship offloads its fuels to surface ships which make the transit to shore markets in the same manner as liquid natural gas tankers and cargo ships do today.

In very deep water, greater than 1000 meters, it is not economic to employ the power cable 13 to and from the seabed. In this case, the factory ship is located in the center of a circular grid of very large windships and the collection of the individual power cables 13 is done on the sea surface using mooring buoys. In this flotilla the mooring cables 11 and anchors 9 are spaced far enough apart from each other that sufficient scope exists in each windship's watch circle to avoid interference between windships. The factory ship in the center is positioned with little or no scope allowing a stable position-keeping for the power cable collection point. The mooring buoys for the surface cables have sufficient "slack" to allow complete repositioning of the windship fleet around the factory ship. In this way flotillas of windships can be deployed in very deep water practically anywhere on the oceans. However, the most productive wind energy sites on the oceans are on the continental shelves. It is to be understood that while this document refers to the wind turbine being located at a location in the ocean it could also be located in a fresh water body such as the U.S. Great Lakes. The invention is useful in shallow water but it is particularly well-suited for deep water locations where piling foundations are not practical.

The submersible hull 7 tethered to an anchor 11 provides several advantages over prior art offshore wind turbines, which are supported on foundations embedded in the seabed at shallow water locations. The first advantage is that it allows offshore wind turbines to be located in relatively deep water. Another major advantage is that the entire wind turbine can be assembled at the shoreline in an existing shipyard. After assembly, the wind turbine is towed to its desired location. Once at the desired location, the anchor 9 is simply dropped to the ocean floor along with the power umbilical cord 13, and the windship 1 is ready for operation. This saves the complication of wind turbine assembly at sea using costly and fragile cranes and other equipment. Another drawback of prior art offshore wind turbines is that the piling foundations pose a significant environmental issue and navigation hazard because they remain in place long after the wind turbines are removed. With the present invention, the tether line 4 is simply cut and the wind turbine can be towed away when its useful life has expired. This leaves only the anchor 9 in place which poses very little disruption to the seabed environment. Another major advantage has been described above, and is the ability of a windship 1 to "train" into the wind direction, eliminating the need for a yawing drive for the turbines.

Figures 4, 5:
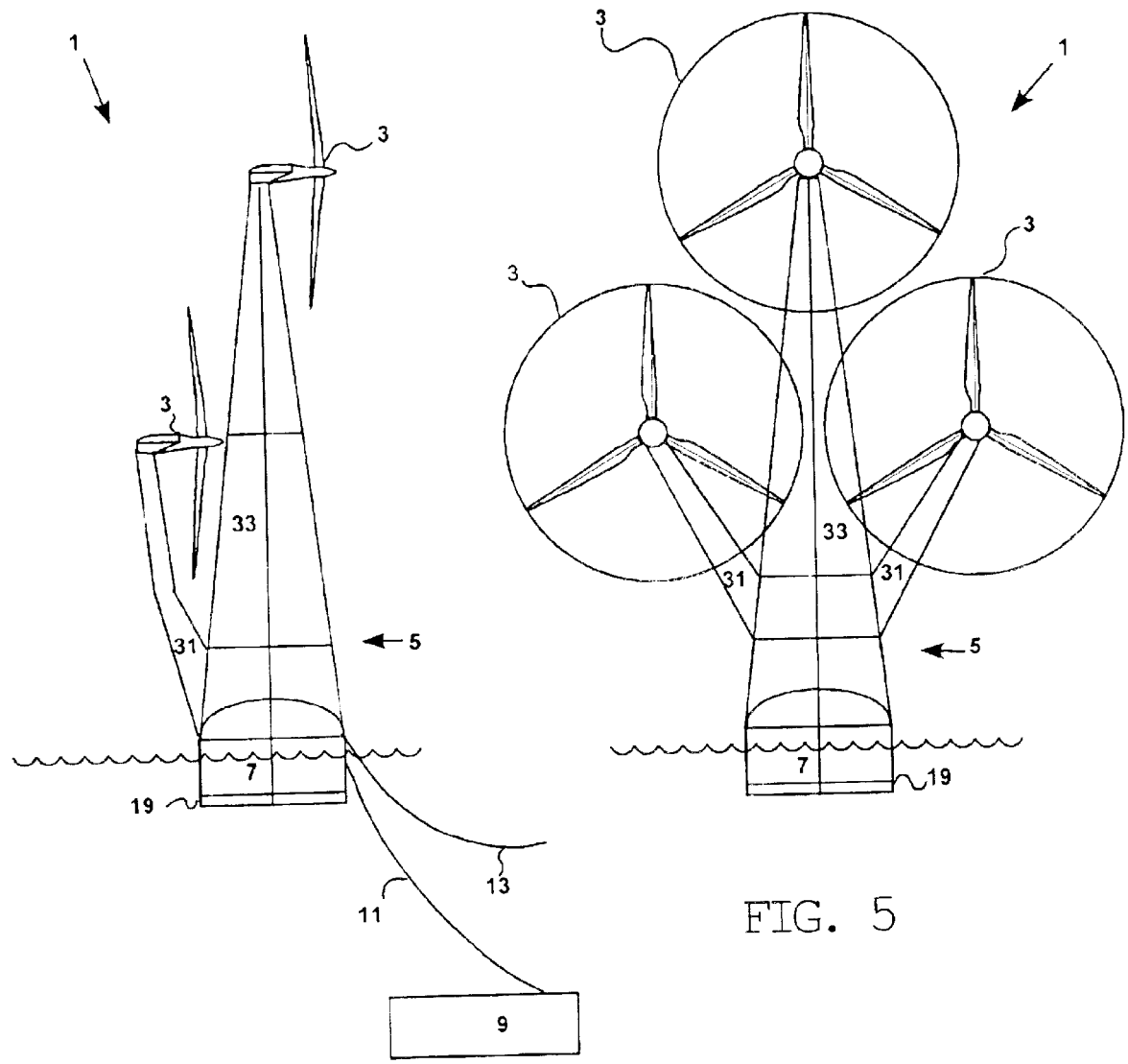
FIG. 4 shows a side view of a windship according to an embodiment of the present invention.
FIG. 5 shows a front view of a windship according to an embodiment of the present invention.

FIGS. 4 and 5 show windship 1 from the front and side respectively. These Figures illustrate an embodiment of the present invention which rests on a sem-isubmersible hull at sea, and which uses three prior art diameter turbines 3. It is contemplated that the wind turbines 3 are commercially available conventional turbines, each with a 66 meter rotor diameter, although one of ordinary skill in the art may select alternate rotor sizes depending on site conditions or other criteria. Commercially available wind turbines in the 66 meter size range are presently being installed at sea in shallow water, but an expensive piling must be drilled or mounted in the seabed for a foundation. Additionally, manufacturers must assemble their large turbines at sea on these pilings using expensive and complicated equipment. In the present disclosure the same 66 meter wind turbines 3 can more easily be deployed in an array on a windship 1. It is contemplated that each of the wind turbines 3 should be optimized for the wind that is experienced at its location. Windships 1 may use many different sorts of towers including those most commonly used today, and can utilize any sort of wind turbine. The less aloft weight, the less expensive the windship 1 will be to construct.

In FIGS. 4 and 5, the tower 5, which includes the central tower 33 and the side towers 31, is supported by a semi-submersible hull 7 that provides buoyancy for the windship. The hull 7 is held in place by a tether line 11 that is attached to an anchor 9 on the ocean floor and uses a lowerable ballast box 19 for stabilization. The tether line 11 that connects the hull 7 to the anchor 9 is at an angle and it allows the entire windship to move in a circle around the anchor 9. Due to the wind load on the turbines 3 and tower 5, the location of the windship 1 changes with wind direction and ocean current so that the wind turbine is always downwind of the anchor 9. The tether line 11 is connected to the hull 7 on the upwind side of the hull 7 so that the wind turbines 3 are always oriented to face into the wind as the wind direction shifts. This eliminates the need for a yaw drive mechanism on the turbines, which land-based systems require. Yawing of the windship 1 may be augmented by adjusting the aerodynamic forces on the two side rotors 3. Aerodynamic forces may be controlled by adjusting the blades' pitch angle, or the rotor's rotational speed, or both. If there is a differential in aerodynamic forces on the side rotors, then a net yaw moment will be developed and the windship 1 may be yawed to face the wind. Alternately, instead of controlling the aerodynamic forces on the side rotors 3 to produce a net yaw moment, a yaw moment may be developed on the windship 1 by cyclically pitching the blades of one or all of the rotors 3. Cyclic pitching can create a net yawing moment as is done on helicopter rotors to achieve maneuverability. Cyclic pitching is complicated and can be unreliable and so the best mode for carrying out the invention is control of the side rotors 3 to develop a differential in aerodynamic forces.

A power umbilical 13 can be seen in FIG. 4 to extend from the base of the wind turbine tower 5 toward a central collection point. Power umbilicals 13 would connect all of the windships in an offshore wind farm and collect the power at a central location. From there, the power could be transmitted back to an onshore location as electrical power or it could be converted to hydrogen through electrolysis, and the hydrogen and hydrogen-based fuels could be transported onshore.

FIG. 6 shows a side view of a windship with fifteen rotors 3 according to an embodiment of the present invention, and shows details of the aloft support structure; a truss tower structure 5 holding fifteen wind turbines 3. It is contemplated that the wind turbines 3 each have a 20 meter rotor diameter, although the one of ordinary skill in the art may select alternate rotor sizes depending on site conditions or other criteria. This truss structure is tension member stiffened using wire rope or guy wires. This makes the tower structure lighter since less rigid steel material is needed with a tension stiffened tower 5. Also, owing to the lower weight of the wind turbines 3, when compared to a single large rotor turbine, the tower structure is lighter than a prior art wind turbine tower. It is advantageous to emplace the individual rotors 3 on the support structure where a hard point is available, and where the support deflections are a minimum. These positions are an inherent part of the design of the support structure for each array, and depend on the height of the array, the number of rotors 3, the diameter of the rotors 3, and the power required in the array.

FIG. 6 also depicts the semi-submersible deep water windship 1 with a ballast box 19, in raised 19a and lowered 19b position. The function of the ballast box 19 is to provide more or less stability to overturning moment when the wind speed increases or decreases, to the thrust load produced by the operating wind turbine rotors 3 and the tower 5.

Due to the lower weight of the basic wind generators 3 and tower 5, when compared to the single-rotor designs, much lower overall weight aloft is achievable with the arrays and tension member stiffened structures for the same output power. Alternatively, the aggregate rated power of all of the wind turbines 3 combined can be much greater than for similar aloft weight compared to a single prior art wind turbine. The aloft weight is important in a seaworthy marine structure since it determines the metacentric height, which is the basic measure of stability of any ship in heavy seas.

FIG. 6 shows a mooring buoy 25 used to offset vertical forces caused by the weight and drag of the tethering cable 11. In this embodiment there is a power cable 13 conjoined with the tether 11. To get power to the power cable 13 from the windship 1 a slip ring assembly 27 may be employed to transfer power in a way which leaves a degree of rotational freedom in the tether 11 and power cable 13 assembly. From the anchor 9 is a sea bed power cable 29 for combining the electrical output of an array of windships 1 and delivering it to a utility grid or a central factory ship.

Figure 7:
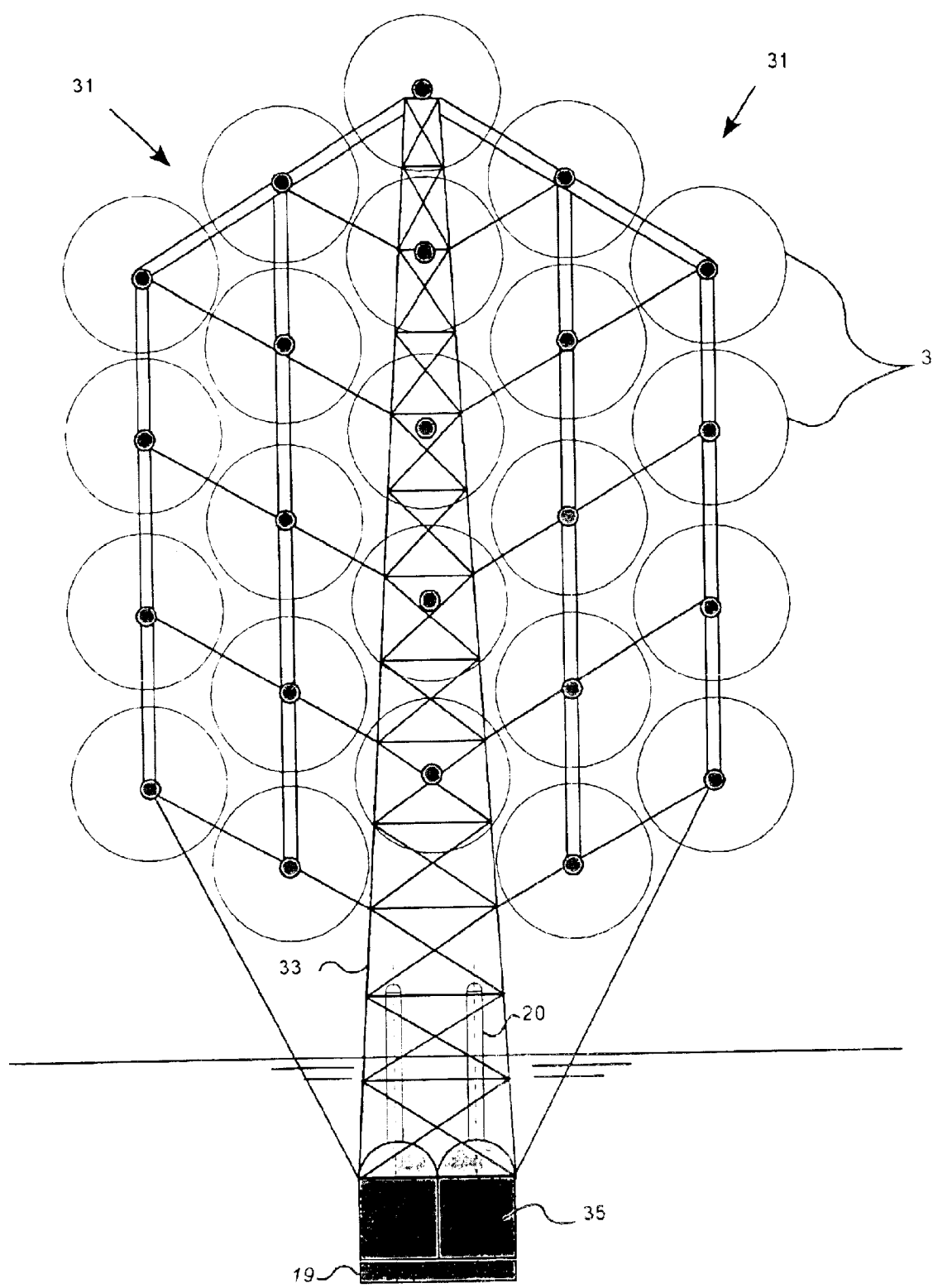
FIG. 7 is a elevation view of a windship according to an embodiment of the present invention.
Figure 8:
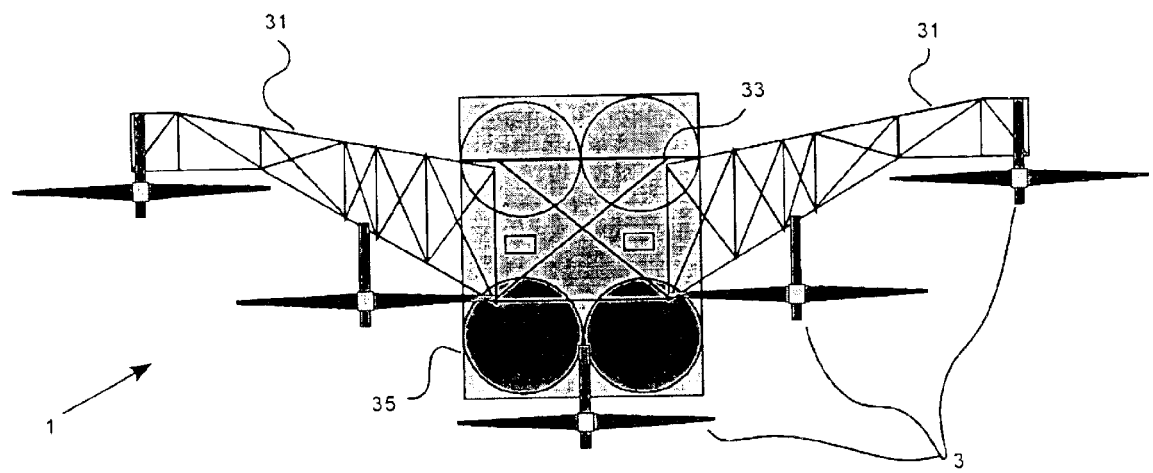
FIG. 8 is a plan view of a windship according to an embodiment of the present invention.

FIGS. 7 and 8 show another embodiment of the present invention. FIG. 7 shows a frontal view and FIG. 8 shows a top view of a truss tower structure holding 23 wind turbines 3. This truss has structural wings 31 coming out at appropriate angles from a simple center truss 33 so as to manage the aloft weights and other operating loads imposed by the turbines 3 on the structure. In this embodiment, the wings 31 can be constructed of steel, aluminum, or even fiberglass composite. The wings 31 are flat span structures which provide the hard points for the rotors and distribute the loading on the center truss evenly. This embodiment has an advantage over a simple center truss design because the loadings are distributed over the entire structure rather than being centralized at the top only as is the case with the prior art wind turbines on prior art towers. This feature also allows the center of gravity to be lower, and the stability to be greater.

The design of the vertical space frame on the central pylon 33 employs tension members whenever possible. This follows normal naval architecture procedures as in the "stayed mast" tension members required of sailboats. This approach is called "tension member stiffened" masts and spars. These wire ropes or aloft guying cables are used to efficiently transfer the weight and thrust loads of each rotor 3 into the central pylon 33. One efficient design approach uses a hexagonal-shaped tower cross section for the central pylon 33. This allows the efficient placement of horizontal wings 31 or loads at the four hexagonal "faces" which face either side of the wind direction, fore and aft.

The wings 31 or horizontal frames which hold the wind turbines 3 are relatively light structures. There is little or no column buckling requirement for these wings 31 since the loads produced by the turbines are in bending only along the structure. The wings 31 also contain crew access-protected walkways to allow maintenance at sea. These wings 31 could also be employed on a prior art tubular wind turbine tower. In this case the loads imposed on the tube tower would be far less than the capability of the tower. Therefore the entire support structure using a conventional tube tower is heavier and costlier than an appropriate windship truss pylon because the tubular tower used for the central pylon 33 would be over-designed.

Smaller vertical array towers, those with 12 or fewer rotors, can have wings 31 which are unguyed, and use conventional horizontal truss designs. In this approach the turbine supports and wings 31 must have sufficient bending strength in the horizontal plane to resist all the aerodynamic cantilevered moments imposed on the central pylon 33. The wing 31 material can be steel, aluminum, composite, or wood. Various engineering approaches such as choice of materials and efficient truss design can be used to reduce the aloft weight of the tower structure. This is advantageous to seaworthiness since it affects metacentric height and stability. In this manner the windship towers 5 are far lighter and less expensive than prior art wind turbine towers, even if there is no use of tension-stiffened members.

The semi-submersible hull support structures 7 described herein can be used directly with the single large prior art wind turbine designs, and can be deployed using commercially available wind turbines. More power, less weight, and less cost, and greater stability are the benefits of changing from a single large rotor atop a tower to an equivalent vertical array wind turbine.

FIGS. 7 and 8 also show a quad-cylinder semi-submersible hull 35. This is a method for using four smaller windship hulls ganged together to support a larger aloft array. This embodiment also uses a moveable ballast box 19 to improve the stability in high seas and high winds. A jacking mechanism 20 is used for lowering the ballast box 19 from the raised position shown in the figure to a lowered position that increases the stability during high wind conditions. The jacking mechanism is not shown in detail in FIGS. 7 and 8 but one of ordinary skill in the art would be able to design such a mechanism from commercially available parts. FIG. 8 shows the offsets required in the truss tower and wings 31 to allow even spacing of the wind turbine rotors on the structure.

The various embodiments disclosed herein use different number and configuration of wind turbine rotors. It should be noted that the number and configuration of rotors in a windship is a design choice that depends on various factors driving the design. The number, size, and configuration of the rotors depend on site specific conditions such as wind shear, turbulence, distance to shore, permitting issues, water depth, wave and current conditions, and other criteria. The design of the vertical array also depends on criteria such as the cost and availability of tower materials, the desire to use commercially available prior art wind turbines in the array, maintenance considerations, and the size capability of the shipyard where the windship is to be assembled.

Figure 10:
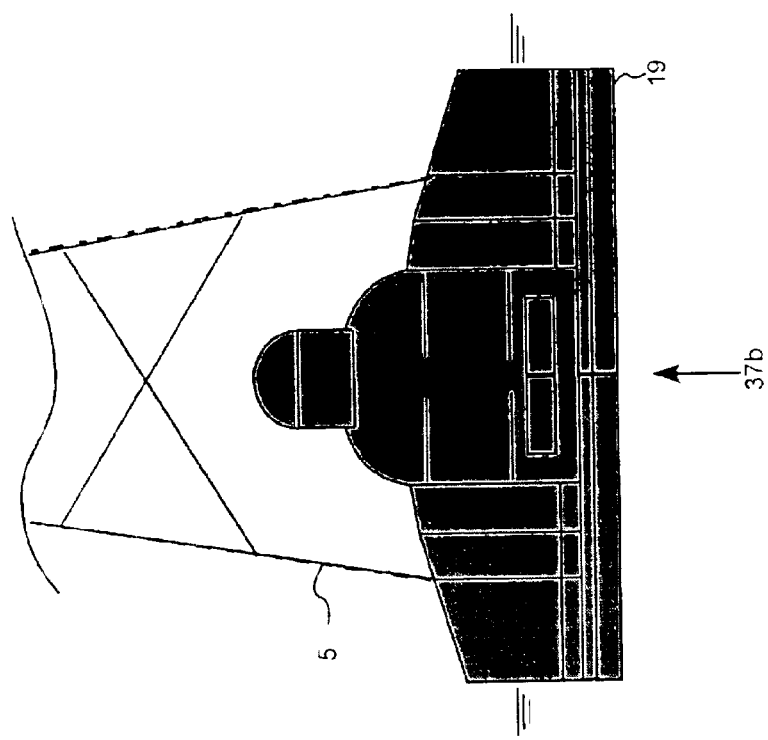
FIG. 10 is an elevation view of another "pillbox" windship design according to an embodiment of the present invention.
Figure 9:
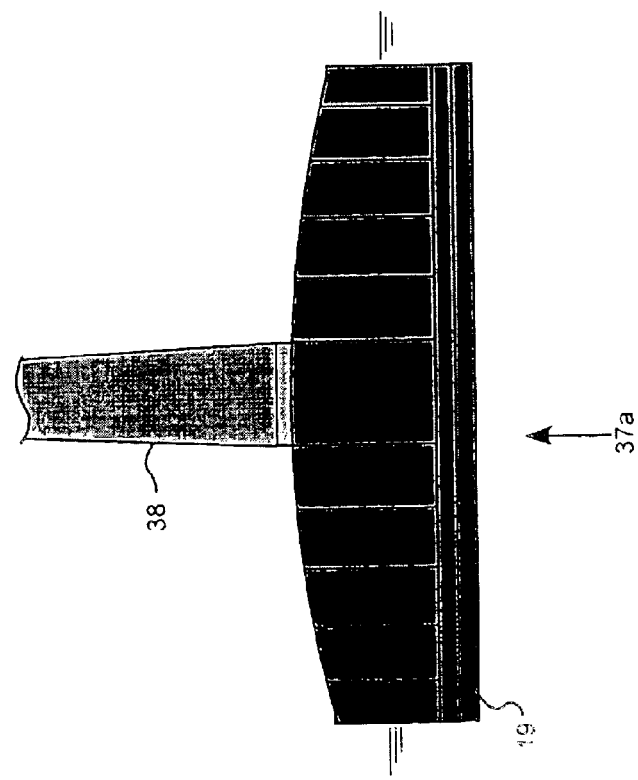
FIG. 9 is an elevation view of one "pillbox" windship design according to an embodiment of the present invention.

FIGS. 9 and 10 show two front views of an embodiment of the present invention in the form of a differently shaped semi-submersible hull 37 called a "pillbox" since it resembles one. Such a shape can be constructed either of steel-reinforced concrete, fiberglass composite, or steel. Within the pillbox hull 37 is ample space for generators, electrolyzers, or whatever equipment necessary for a complete windship. Shown are two variations of similar pillbox hulls 37 each to support a different style of wind turbine. FIG. 9 shows a pillbox hull 37a for a standard wind turbine tubular tower 38 that, for example, would allow the deployment of commercially available 66-meter diameter wind turbines far out at sea. This hull design permits the weights, moments, and loadings of a commercially available 66-meter wind turbine to be accommodated in the structure. Stability is again achieved by a lowerable ballast box 19. FIG. 10 shows a pillbox hull 37b designed for a truss tower 5. While a single large commercially available prior art wind turbine may be accommodated on the pillbox hull design shown in FIG. 9 or 10, the best mode for carrying out the invention is utilization of an array of smaller wind turbine rotors. By way of example, a pillbox hull sized and designed to accommodate a single 66-meter commercially available wind turbine with a rated capacity of 2 MW may alternatively accommodate an array of 12 smaller rotors each with a rated capacity of 440 kW for an aggregate rating of 5.3 MW. Since the cost of the pillbox hull is the same in both cases, there is a clear advantage to using the array of smaller rotors. The main advantage to using a single large commercially available wind turbine is that the commercial market has come to accept large wind turbines and there may be business or marketing reasons for employing a single large commercially available wind turbine on a windship.

Figure 11:
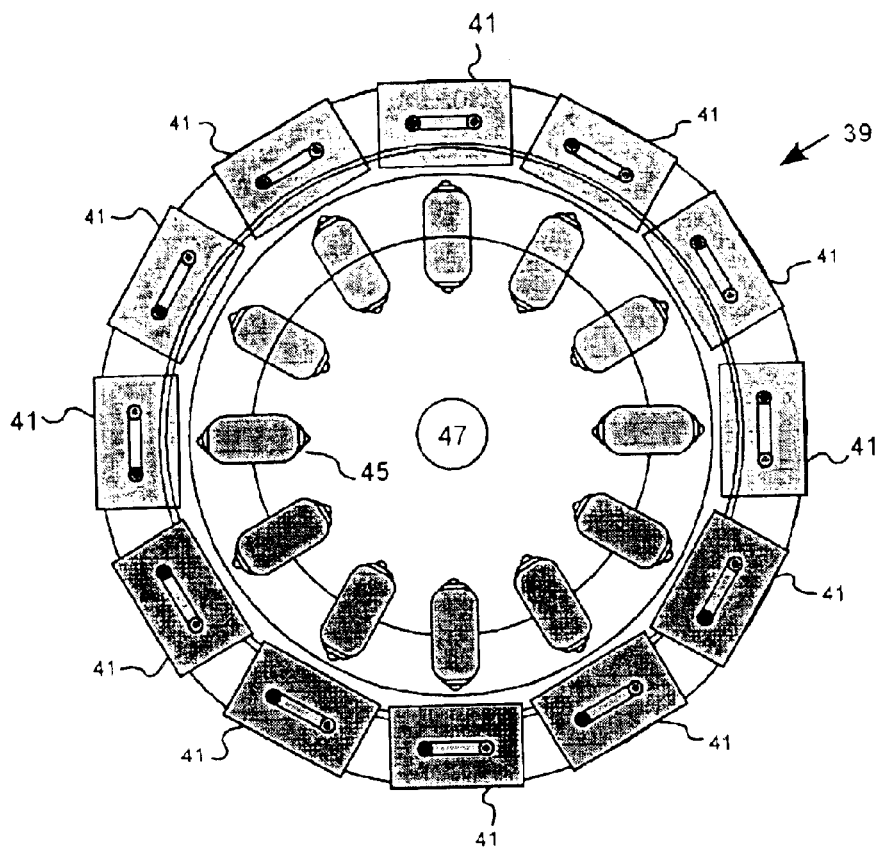
FIG. 11 is a plan view a "muff hull" windship for shallow water according to an embodiment of the present invention.
Figure 12:
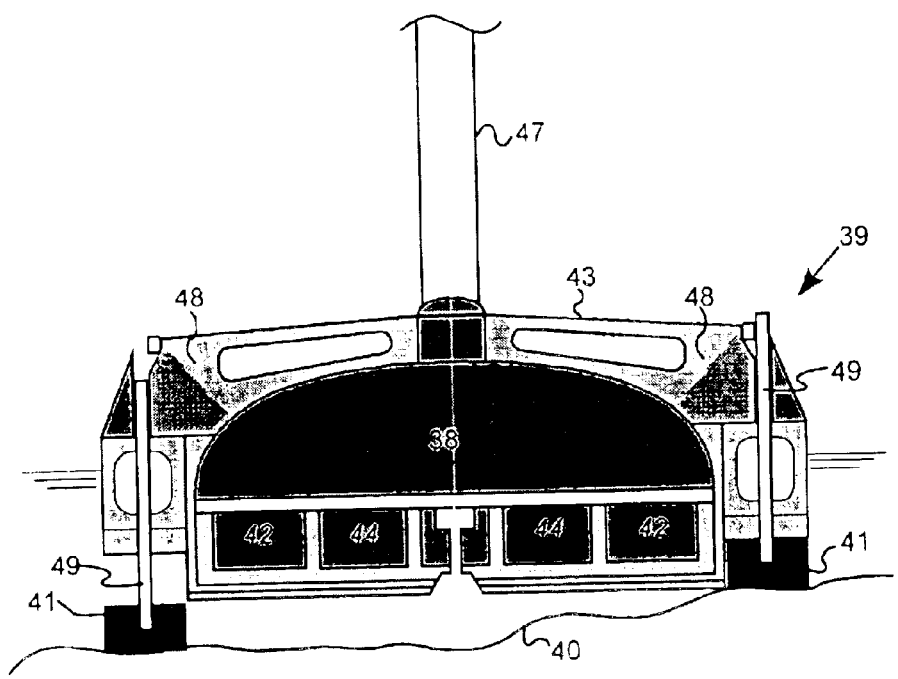
FIG. 12 is an elevation view a "muff hull" windship for shallow water according to an embodiment of the present invention.

FIGS. 11 and 12 show an embodiment of the present invention in the form of a shallow water windship hull called a muff hull 39, from the top and from the side respectively. The muff hull 39 is fabricated of reinforced concrete, with concrete vertical bridge members 48 employed to straighten the top of the hull above the water line. A large volume 38 is provided inside the muff hull 39 for ballast and to house various power and processing equipment, as well as other possible uses. The muff hull 39 has a plurality of feet 41. Twelve feet 41 are employed in the embodiment as shown in FIG. 11, although the actual ballast and to house various power and processing equipment, as well as other possible uses. The muff hull 39 has a plurality of feet 41. Twelve feet 41 are employed in the embodiment as shown in FIG. 11, although the actual number of feet is a matter of design choice. The feet 41 are made of concrete and structural steel so that they have large negative buoyancy and they articulate vertically on the hull periphery to accommodate an uneven sea floor 40 in shallow water. The feet 41 have stanchions 49 extending vertically above them. The feet 41 are designed so that the stanchions 49 are vertical when the feet 41 rest on the sea floor 40. The muff hull 39 has holes that mate with the stanchions 49 so that the hull 39 is guided vertically along the stanchions 49 as the hull 39 moves vertically. In this way, the feet 41 and stanchions 49 guide the hull 39 as it moves vertically during rising and falling tides in shallow water. The stanchions 49 provide resistance to overturning moments for the hull 39. The feet 41 are not powered but simply allow the muff hull 39 to ride up and down along stanchions 49 with changes in sea level. This is necessary in shallow water to achieve perpendicularity of the wind turbine array which is necessary to minimize loads and evenly distribute the aloft weights.

FIG. 12 shows a combination of fixed ballast 42 and variable ballast 44. The fixed ballast can be concrete, crushed stone, or any high-density material. The variable ballast is seawater pumped in or out as in a submarine to vary the buoyancy. This is necessary to provide the additional stability needed in heavy seas, storms, or winds. The semi-submersible design feature is that the floating structure is not rigidly connected to the seabed. This allows the structure to move to an equilibrium position in varying conditions and is more stable than a rigid structure fixed to the seabed. By varying the ballast 44 the hull can be made stable during heaving conditions and high wind conditions. In the embodiment shown, the position variable ballast 44 is fixed and only its mass is varied. However, it would also be possible to vary the position of the variable ballast 44 as shown in other embodiments to further improve the stability of the windship. Windships 1 with a muff hull 39 design can be constructed in a safe harbor and towed into position where the feet 41 are lowered. This is an advantage over prior art offshore turbines which can also be placed in shallow water but must be built in place.

Since the feet 41 are firmly planted on the sea floor 40 it is not possible for a windship 1 using a muff hull 39 design to yaw passively or for the entire structure to yaw during changing wind directions. Thus the muff hull 39 includes a flat surface 43 on top of the hull on which rollers 45 attached to a tower may rotate around a central pole 47. In this embodiment, the central pole 47 is stationary and supports the bending moment at the base of the tower. The wind turbine tower, along with the array of wind turbines, rotates about the pole 47 in the same way as is taught in copending U.S. patent application Ser. No. 10/092,775 entitled Vertical Array Wind Turbine, for land based vertical arrays of wind turbines the teachings of which are incorporated herein by reference.

Figure 13:
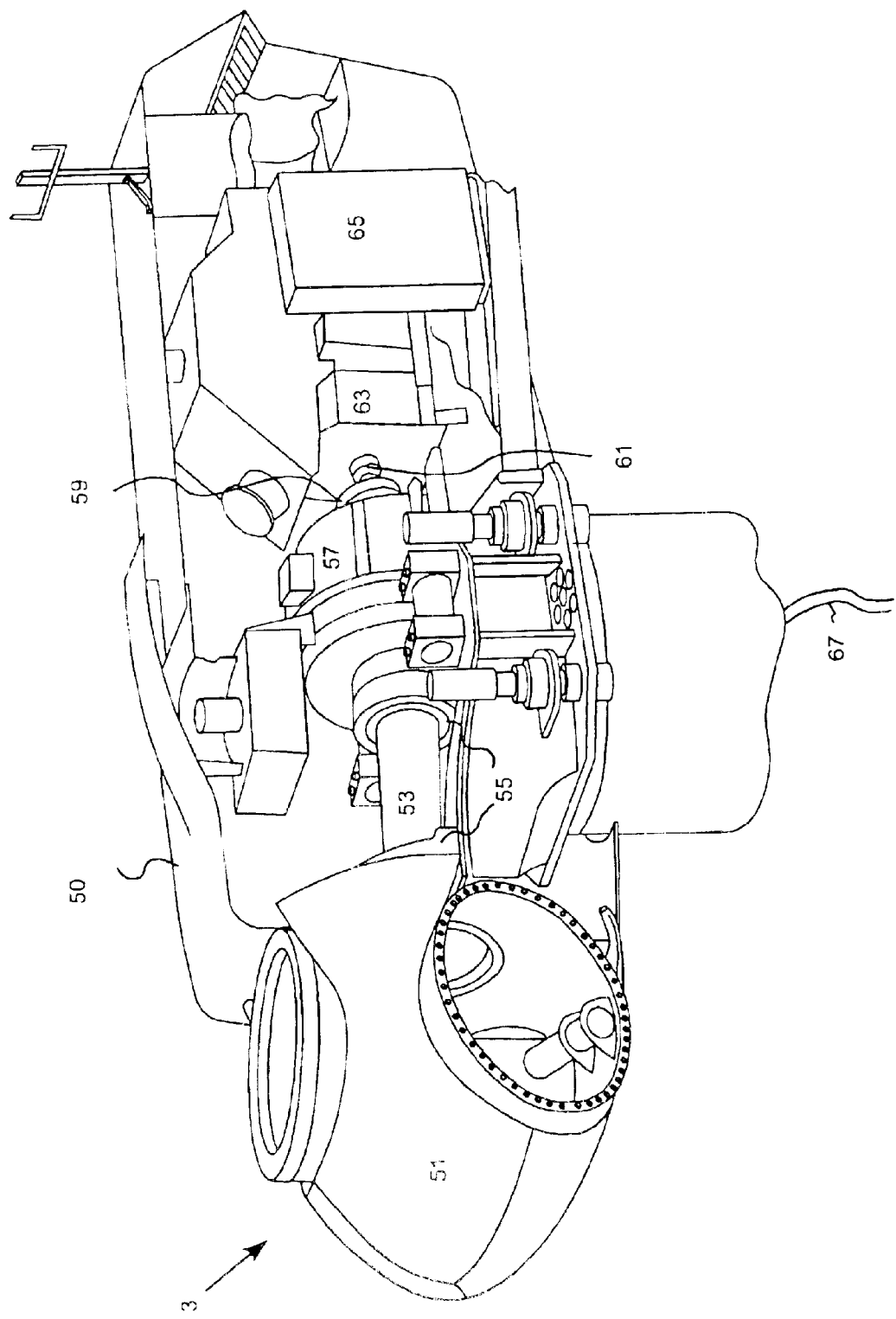
FIG. 13 is a schematic view of the conventional conversion of wind-mechanical low shaft speed energy to usable electrical energy.

The weight aloft in the nacelle of each wind turbine is important for a windship with a semi-submersible hull. Greater weight aloft decreases the stability of the windship. In prior art wind turbines, much of the weight is placed in the nacelle at the top of the tower. FIG. 13 is a cut away view of a nacelle 50 and rotor 3 of a prior art wind turbine showing conversion of mechanical low shaft speed energy to usable electrical energy. A prior art wind turbine drive train contains a rotor 3 consisting of hub 51 and blades (not shown), a main shaft 53, bearings 55, a speed-increaser or gearbox 57, high speed shaft 59, couplings 61, and a generator 63. Power from the generator 63 is either grid quality electricity or is converted to grid quality electricity in a converter 65 which may be aloft with the other components or at the base of the tower. The grid quality electricity is usually combined in power lines 67 leading to a utility interface transformer. The low speed of the rotor 3 is necessary for efficient, wind energy conversion. The main shaft 53 must be strong enough to resist the steady and dynamic loads imposed by the rotor 3, aerodynamic, inertial, and elastic. The bearings 55 must be long-life and practically maintenance-free. The gearbox 57 serves to increase the shaft speed to normal high speeds for current electrical generators. This is generally 1200 or 1800 rpm for generators operating on a 60 Hz grid. Some modern wind turbines have variable speed generators which can accept variable rpm range on the input shaft. The power output of a modern wind turbine drive train is normally 60 or 50-cycle, AC power compatible with the national electrical grid.

An array of wind turbine rotors on a windship as contemplated in the present invention offer the possibility of reducing the weight of aloft components by utilizing alternate techniques for summing the power from each of the individual wind turbine rotors. It is important to keep the weight in each rotor's nacelle minimized. Extra weight that is located aloft will act to destabilize the entire wind turbine system when it is located offshore and extra ballast will be required. Therefore, it is desirable to place as much of the equipment as possible at the bottom of the tower while keeping as little equipment as possible at the top of the tower. To achieve this objective, the present invention contemplates several techniques for converting mechanical energy at each rotor into useful electrical energy. The techniques include various strategies for summing the power from multiple wind turbine rotors on a single windship such that equipment may be displaced from the wind turbines aloft to the base of the tower.

Figure 14:
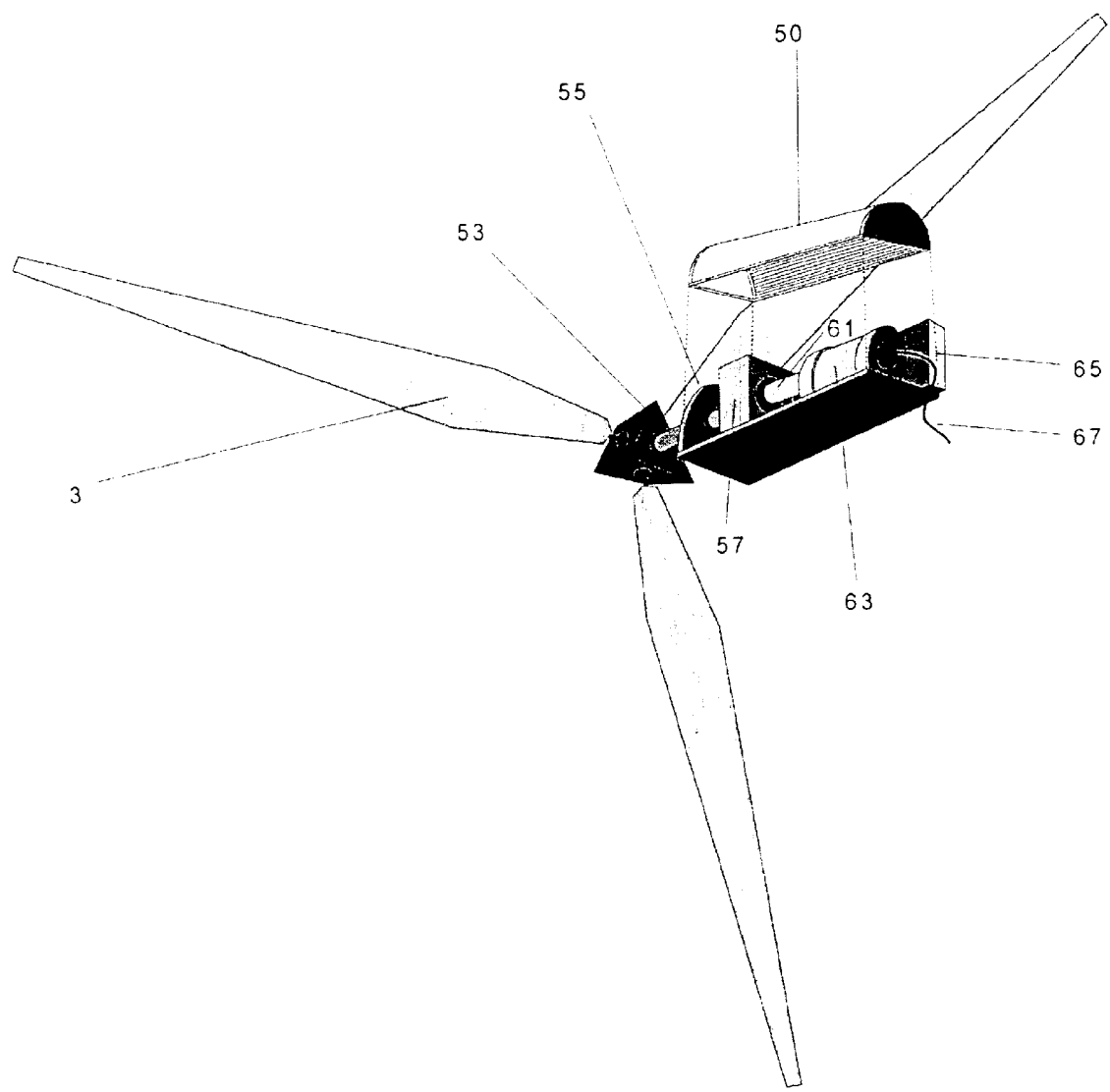
FIG. 14 is a schematic view of the aloft portions of a first embodiment for summation of the mechanical power from individual rotors in an array.
Figure 15:
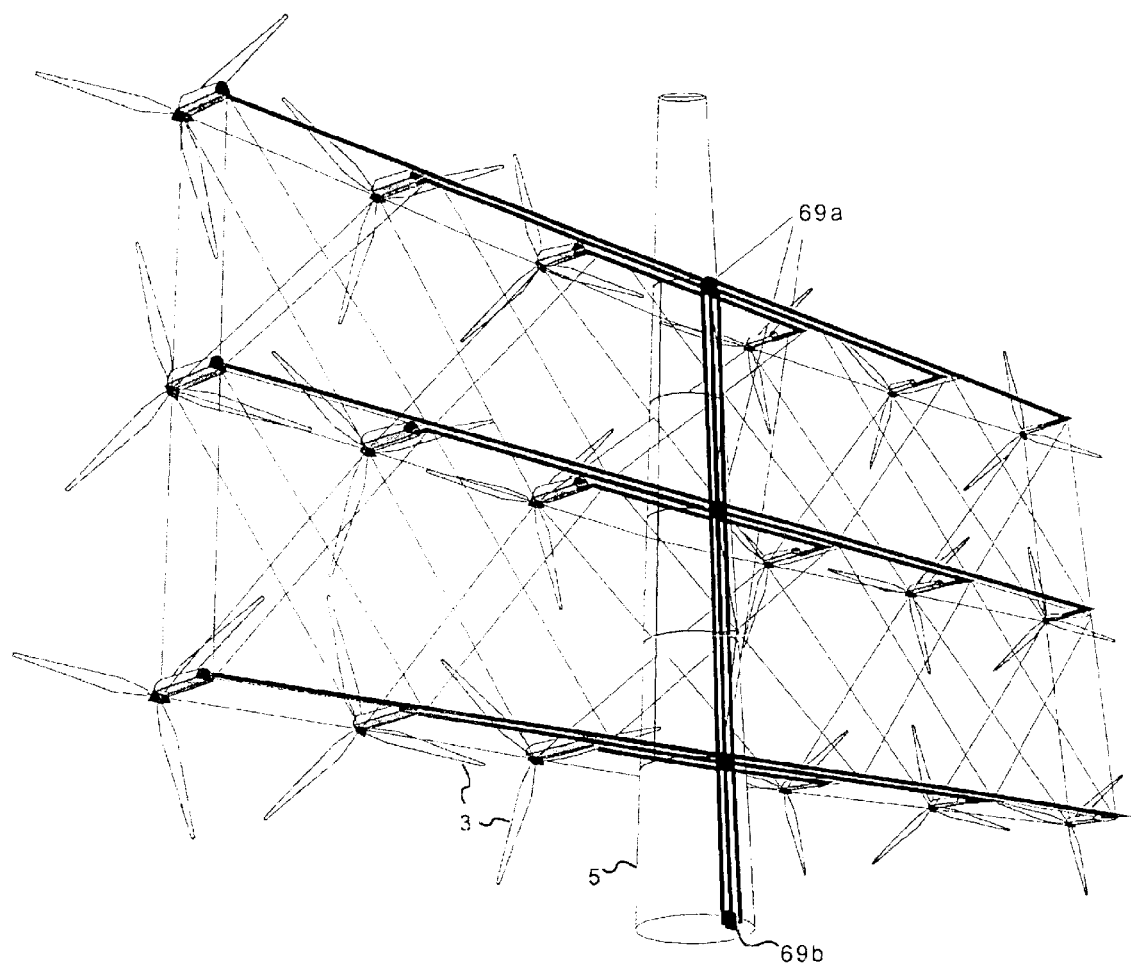
FIG. 15 is a schematic view of the down tower portions of an embodiment for summation of the mechanical power from individual rotors in an array.

One embodiment of power summation uses prior art conventional wind turbine drive trains which can be either AC or DC, and either constant or variable speed. FIGS. 14 and 15 show this embodiment in which grid quality AC power leaves each wind turbine, and the power from multiple wind turbines is summed at the tower base. This is analogous to the summation of power from individual wind turbines at a substation in prior art terrestrial wind farms. FIG. 14 illustrates the drive train details and FIG. 15 shows the power routing down the tower 5 and down tower power elements. This arrangement is the simplest of the embodiments described herein, although it places the most weight at the top of the tower. In this embodiment, the rotor 3 drives a low speed shaft 53. The speed of the shaft is increased in a gearbox 57 and a high speed shaft 61 connects to a variable speed AC generator 63. A power conditioner 65 is mounted next to the generator to convert variable frequency AC power to constant frequency AC power. The power conditioner 65 uses IGBT switches or other solid state devices to convert the variable frequency AC power to DC power and then another set of switches to convert the DC power back to constant frequency AC. A power cable 67 transmits power down the tower 5 to the tower base where it is summed with constant frequency AC power from other rotors in the array in transformers 69 either on the length of the tower 69a, or at the base of the tower 69b. This summed electricity product is compatible with the national grid.

Figure 16:
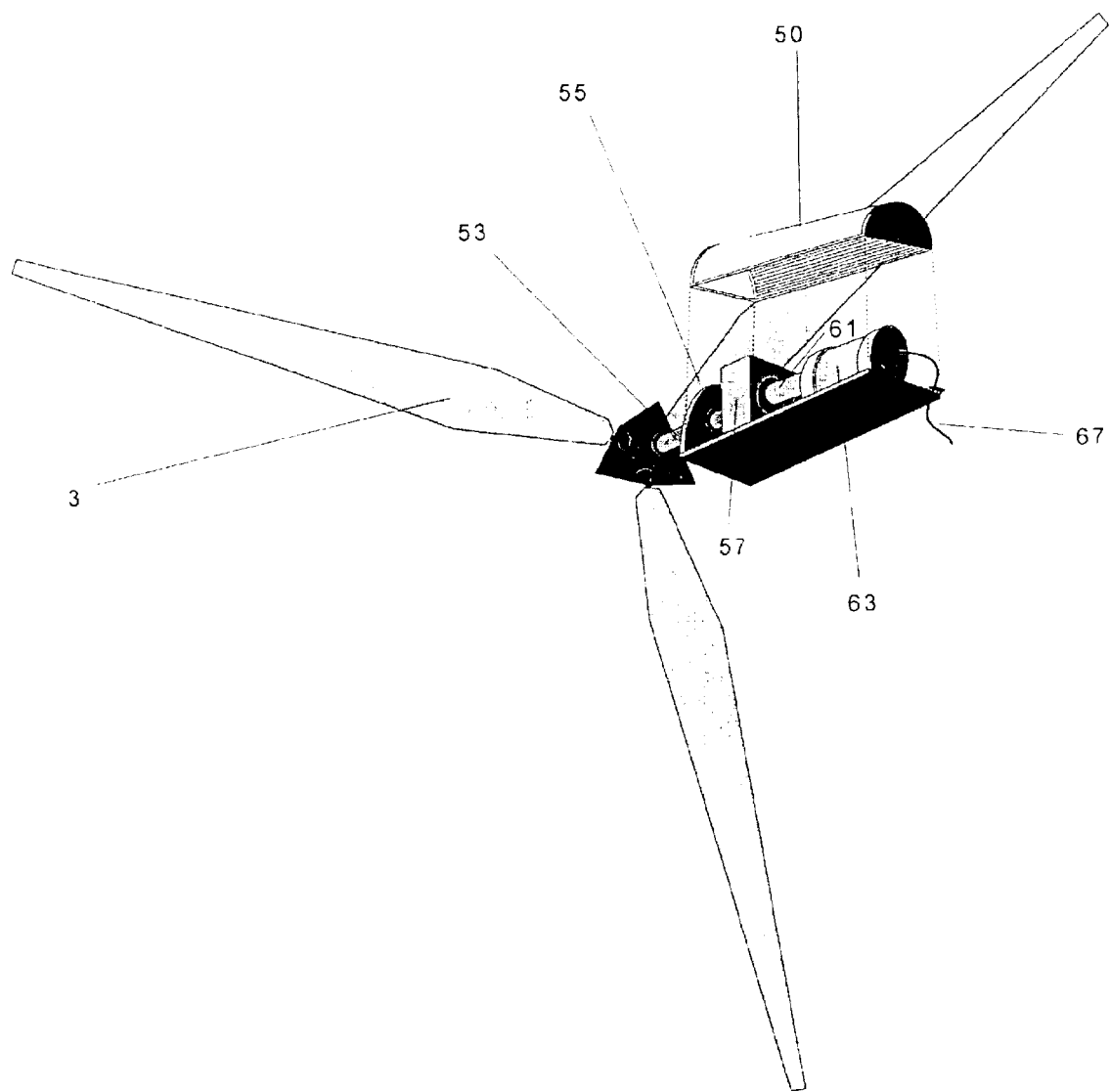
FIG. 16 is a schematic view of the aloft portions of an embodiment for summation of the mechanical power from individual rotors in an array.
Figure 17:
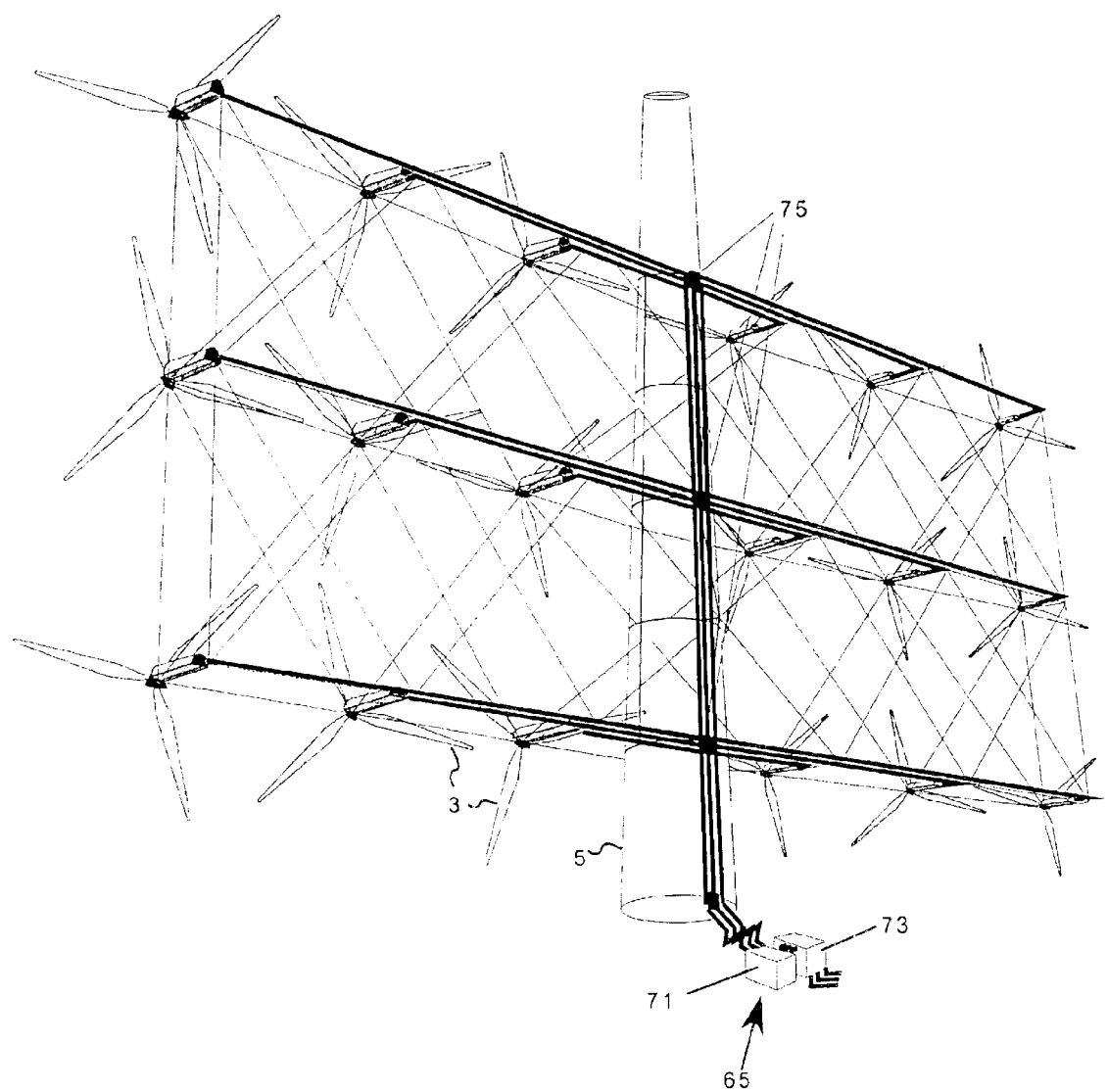
FIG. 17 is a schematic view of the down tower portions of an embodiment for summation of the mechanical power from individual rotors in an array.

Another embodiment of the power summation system is shown in FIGS. 16 and 17. This is somewhat similar to the first embodiment shown in FIGS. 14 and 15 except that the power electronic converter 65 is located at the bottom of the tower 5. Variable frequency AC power from each of the rotors 3 is fed down the tower 5 through junction boxes 75 and into a converter 65. Constant frequency power is taken from the converter 65 to be transmitted onto the power grid or used in generation of hydrogen or another useful product. Two parts of the power converter 65 are shown here, a summing rectifier 71 which converts all the variable AC voltage to DC and sums it, and an inverter 73 which converts the DC to grid quality AC electricity. This embodiment is relatively simple and represents a low-risk solution. Although the weight of the power electronic converters 65 is moved to the bottom of the tower in this embodiment, it has the disadvantage that there is still the weight of a gearbox 57 and generator 63 at each wind turbine rotor.

Figure 18:
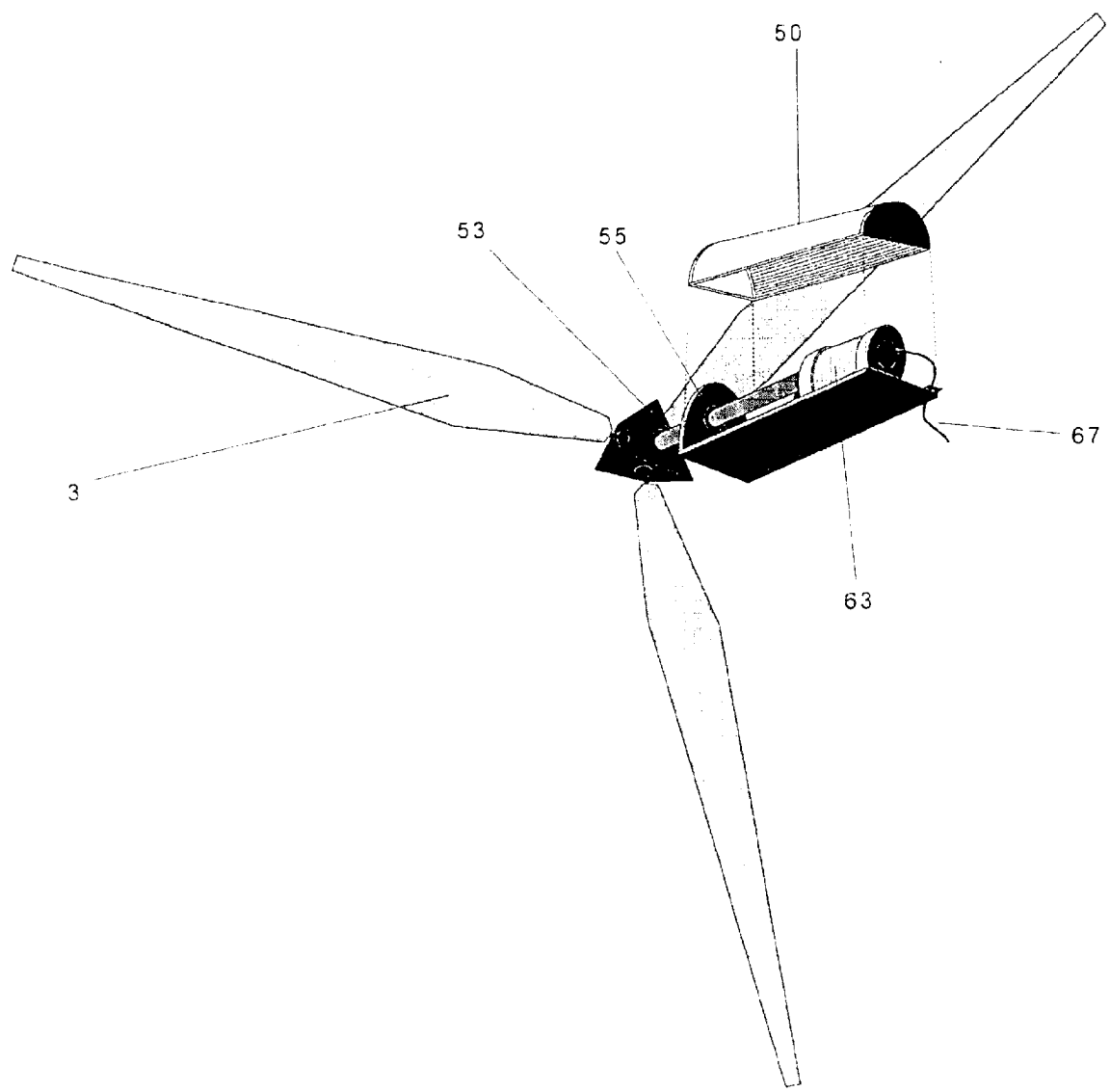
FIG. 18 is a schematic view of the aloft portions of an embodiment for summation of the mechanical power from individual rotors in an array.
Figure 19:
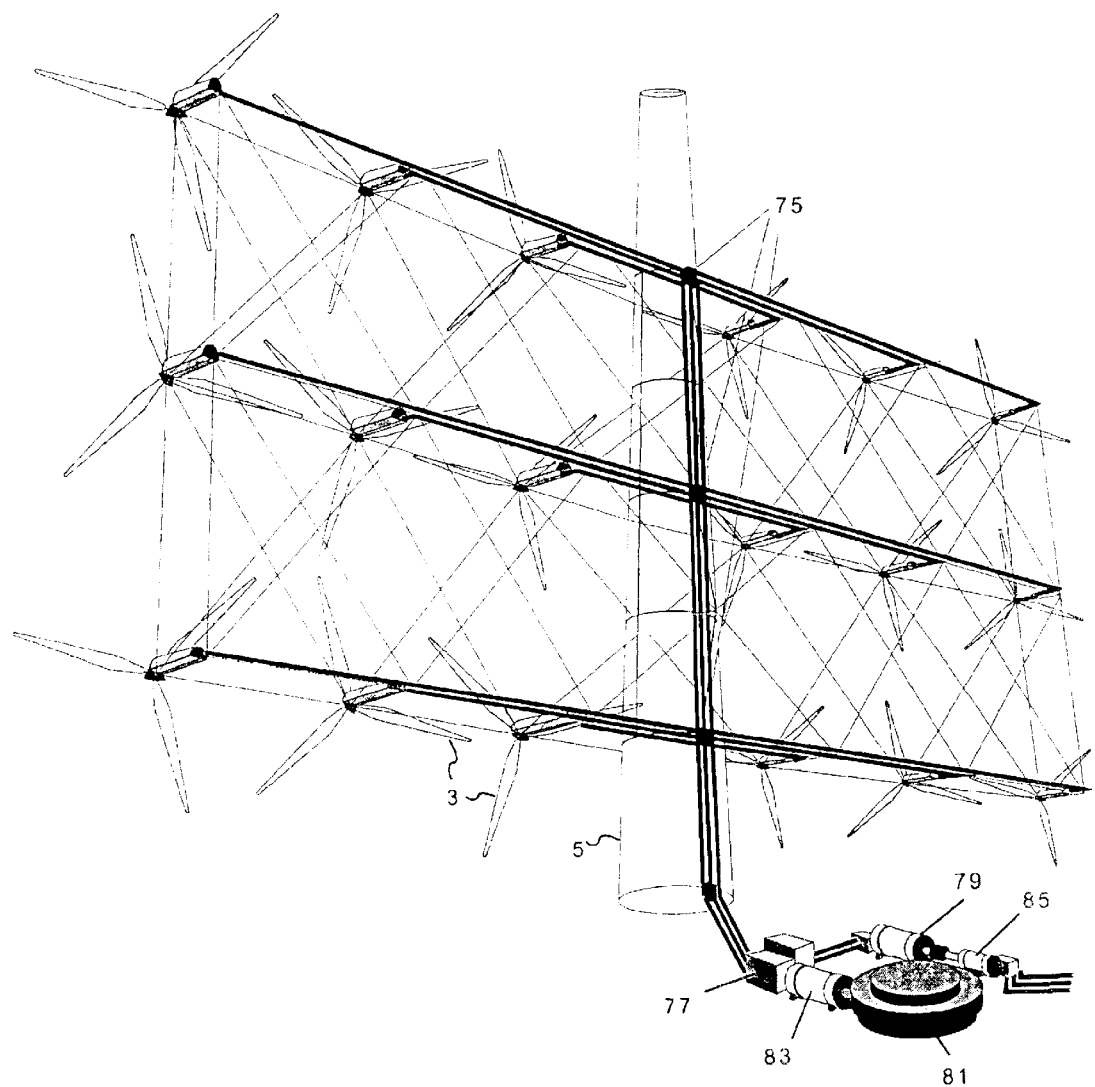
FIG. 19 is a schematic view of the down tower portions of an embodiment for summation of the mechanical power from individual rotors in an array.

Another embodiment of the power summation system is shown in FIGS. 18 and 19. This embodiment eliminates the gearbox 57 by utilizing a low speed direct drive generator 63. Preferably, the generator should be a high voltage DC generator 63 (but could optionally be an AC generator). Generator electrical field control is required for each generator 63 in the wind turbine array so that each rotor 3 can operate at different rotor speeds. This embodiment eliminates the weight of the gearbox 57 and most couplings 59 associated with each wind turbine in the array. This is the preferred embodiment and is considered to be the best mode for carrying out the invention.

The DC power from each generator 63 can be summed and used to drive a constant-speed DC motor 79 at the base of the tower 5. DC power is sent down the tower 5 through junction boxes 75 to a DC buss 77 or bank of DC to DC converters 77 or other device for summing DC power. Optionally, a flywheel 81 smoothes power excursions and provides some energy storage for periods of low wind. The flywheel 81 is shown being driven by its own DC motor/generator 83. The drive shaft from the main DC motor 79 can be used to drive a constant frequency AC generator 85. Power output from the AC generator 85 is fed into the grid or used to make hydrogen, methane, or another value-added product that can be transported onshore. Optionally, instead of using a DC motor 79, fly wheel 81, and AC generator 85, it would be possible to replace these items with a power electronic inverter 73 that converts DC power into constant frequency AC power.

In the embodiment of the power summation system shown in FIGS. 18 and 19, the DC power does not need to be converted to AC power at the bottom of the tower if it is used to create hydrogen, desalinate water, or perform some other task at the tower base. An electrolysis system for extracting hydrogen from water can use a plurality of electrolytic cells, each of which requires a relatively low DC voltage across it and each wants as much current to flow as its plates can handle. In this embodiment the output DC power from the wind turbine rotors 3 is fed into the bank of electrolyzer cells and the cells are successively switched on and off depending on the amount of power being produced. The output products are a stream of pure hydrogen and a stream of pure oxygen. This embodiment is more efficient than the others since the electrical energy goes through fewer conversions, and high-quality 50 or 60 cycle grid power is not required.

Figure 20:
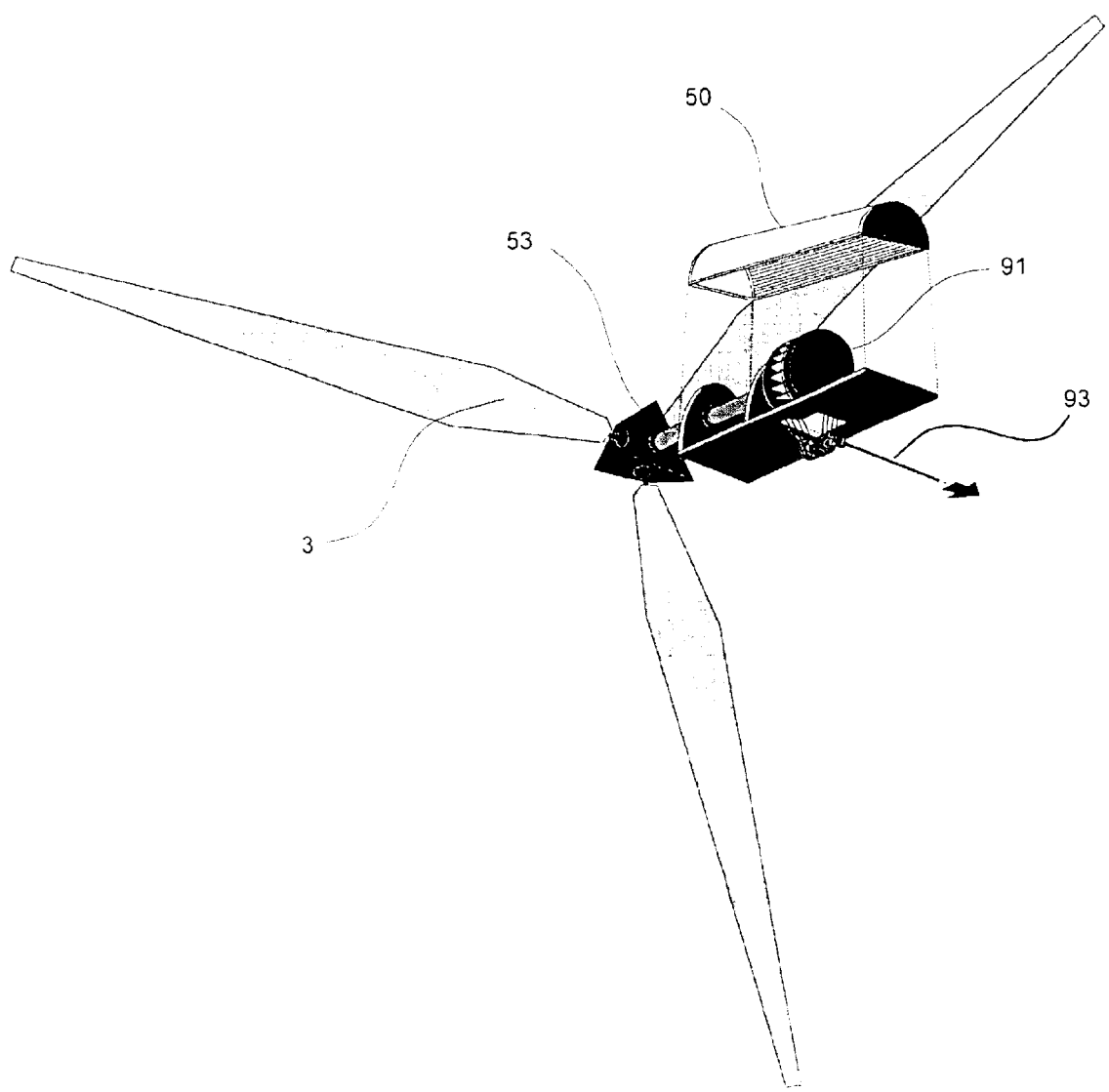
FIG. 20 is a schematic view of the aloft portions of an embodiment for summation of the mechanical power from individual rotors in an array.
Figure 21:
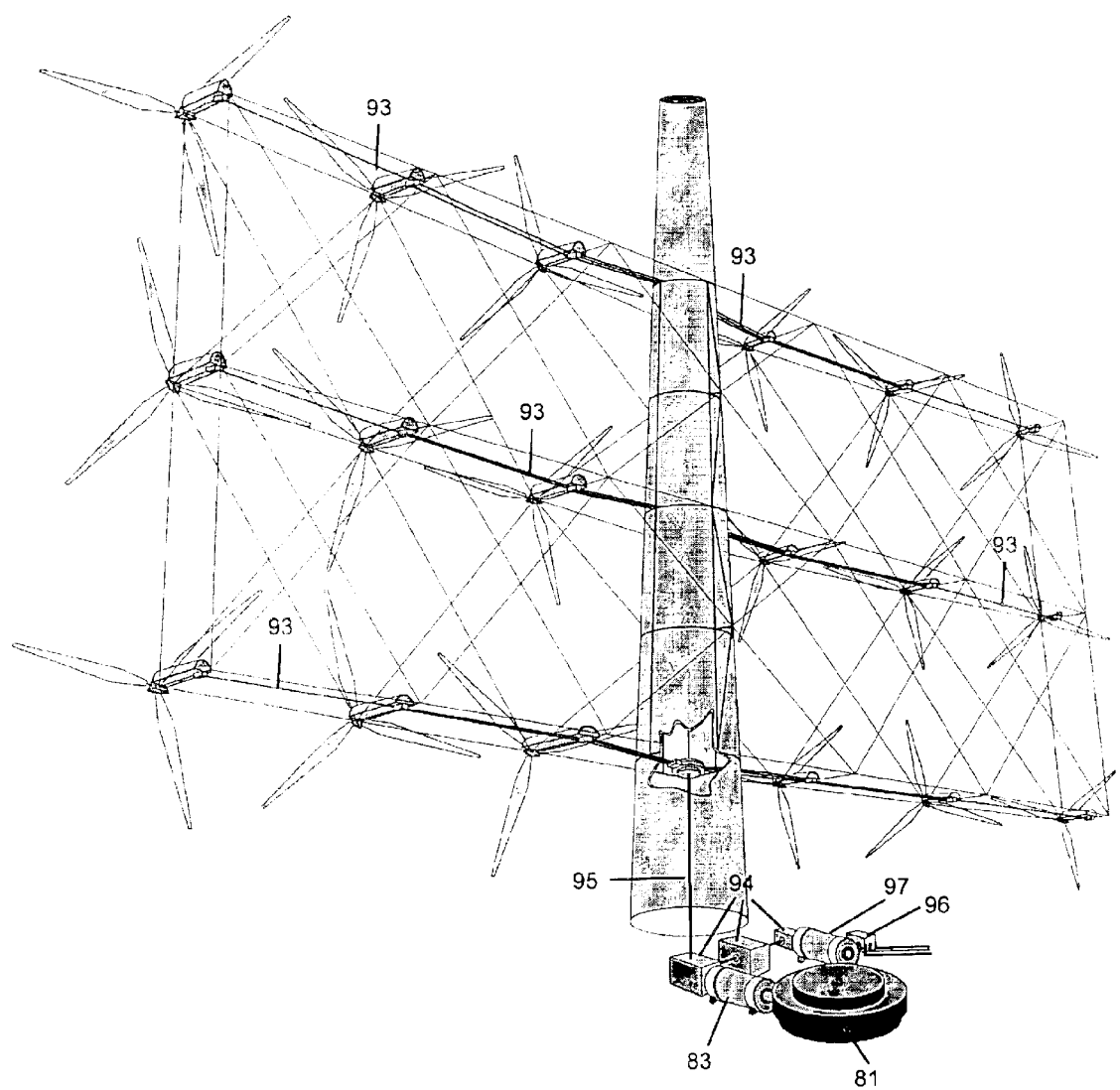
FIG. 21 is a schematic view of the down tower portions of an embodiment for summation of the mechanical power from individual rotors in an array.

Summation of the power from individual rotors 3 in an array may be achieved mechanically. This embodiment of the invention reduces aloft weight to the maximum extent possible but it complicates the entire windship system and presents some technical challenges that may make other embodiments preferable. Completely mechanical systems may be used for transmitting power from each wind turbine in the windship array to a summation point at the base of the tower where the electrical generators are located. The mechanical system can use shafts, belts, wire ropes, gears, or rotating disks to transmit the mechanical energy. One such mechanical system is shown in an embodiment of the power summation system illustrated by the schematic views in FIGS. 20 and 21. Each rotor 3 has a low speed shaft 53 that drives a sheave 91 which in turn drives a cable 93. The cable 93 transmits power from the rotor 3 to a summation shaft 95. Power from each of the rotors 3 in the array is directed to the summation shaft 95 which concentrates the power from all the rotors into a single rotating shaft 95. The bottom of the summation shaft 95 includes a flywheel 81 driven by a motor/alternator 83 to smooth power variations and provide a small amount of energy storage. The summation shaft 95 connects to gearboxes 94 and an AC induction generator 97. The gearboxes 94 may be eliminated if generator 97 is a low speed generator. The output of generator 97 passes through power conditioner 96 where it is turned into grid quality 50 or 60 Hz electricity. The generator 97 is preferably an induction generator, although it could be a synchronous generator or a DC generator. If the output of the generator 97 is variable frequency or if it is DC then the power conditioner 96 must include power electronics to convert the power to grid quality power at the appropriate frequency.

The mechanical power in summation shaft 95 may also be used for pumping water or for providing pressure for a desalination plant or for other useful purposes. Rather than using a sheave 91 and cable 93 system to transmit power from rotor 3 to summation shaft 95, a gear and rotating shaft, or sets of gears, or rotating friction drives, or variable drive disks, can be used. Any suitable mechanical drive train linkage can be used as long as its efficiency is relatively high and it is relatively robust and reliable.

The idea of the process of converting sea water to hydrogen gas using wind power has been suggested by Biederman in the following publication which is incorporated herein by reference: N. P. Biederman, "Wind-Powered Hydrogen/Electric Systems for Farm and Rural Use", Proceedings of $2^{nd}$ Workshop on Wind Energy Conversion Systems, Institute of Gas Technology, Chicago Ill., Edited by the Mitre Corp., Wash. D.C., Jun. 9–11, 1975. Hydrogen in that study was used as a storage medium for wind energy plants. Hydrogen is produced along with the electricity product, and stored for later use. The wind electricity to the grid is then "firmed up" by fuel cells converting the stored hydrogen to electricity when wind is low. Such a system is self-sufficient and can be built by coalescing commercially available components and systems.

The system for accomplishing wind powered production of hydrogen is simple. Wind mechanical shaft energy runs an electric generator. The electric generator produces DC electric power. This DC power is used to operate banks of electrolytic cells. The electrolytic cells produce pure hydrogen gas and oxygen gas at atmospheric pressure from a pure water source. Finally, the hydrogen is stored either as a pressurized gas, in a cryogenic liquid form, or as molecules attached to metal anhydride salts. Then, when firm grid electricity is required, the hydrogen gas is combined with oxygen gas from the atmosphere in a fuel cell. The fuel cell produces DC power which can be used to operate a constant power, constant frequency AC generator, or an inverter to produce power on the utility grid. Such fuel cells are commercially available today, and in various sizes and power ranges. Some require pure oxygen and some can use normal atmospheric air.

Figure 22:
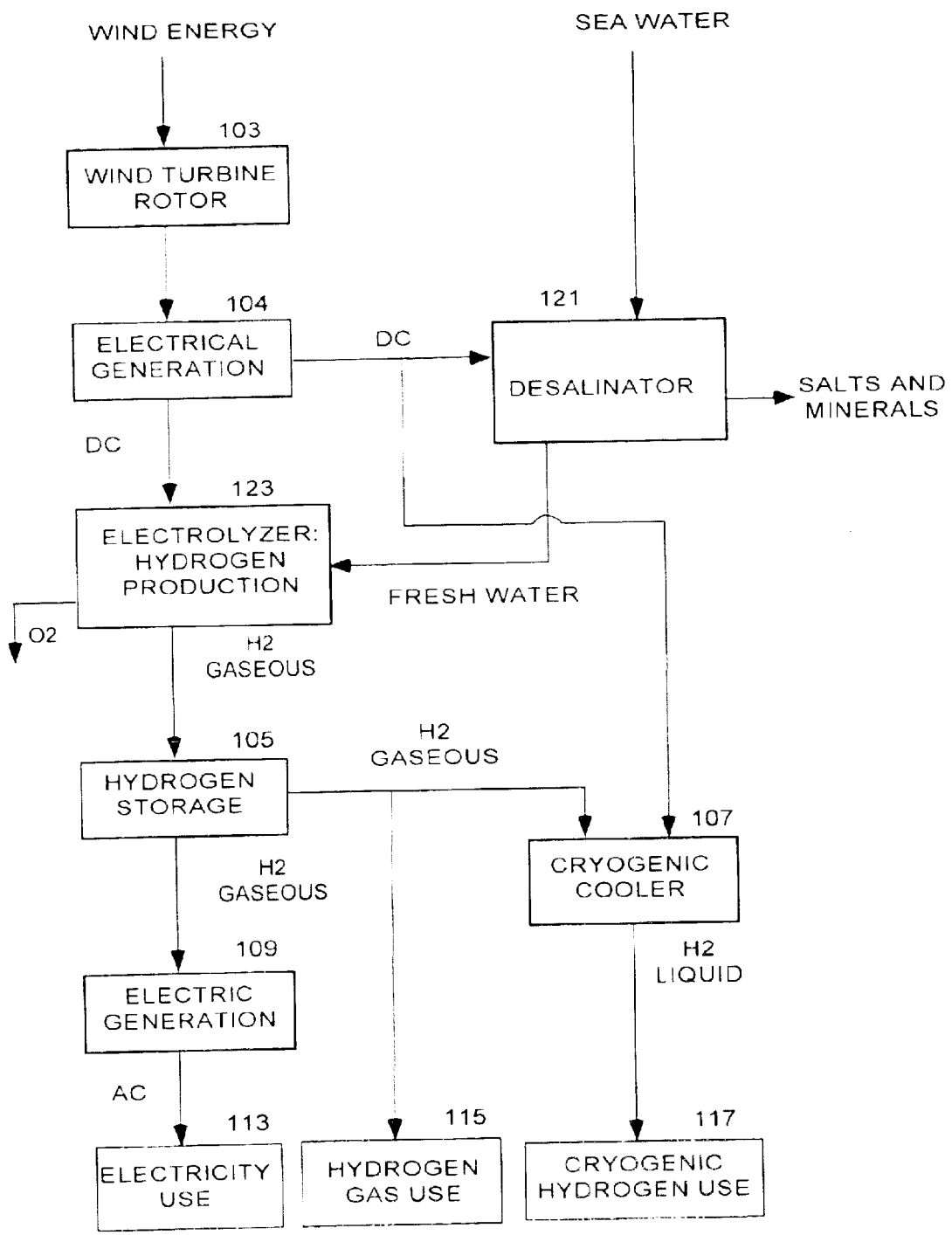
FIG. 22 is a flow chart describing the process for generating gaseous and liquid hydrogen from the atmosphere using wind power.

FIG. 22 shows a flow chart illustrating the process for generating gaseous and liquid (cryogenic) hydrogen from sea water using offshore wind turbines. Energy in the wind is captured and turned into rotating mechanical power by the wind turbine rotor 103 which drives a DC generator 104. This DC power operates both a desalinator 121 and the electrolytic cells of an electrolyzer 123. For sea water to be used, a desalination stage 121 is required to produce essentially distilled water for use in the electrolyzer 123. The desalinator 121 is preferably a simple reverse osmosis pumping system which removes the salts and impurities in the sea water and yields fresh water and a byproduct of salts and minerals. Optionally, the reverse osmosis desalinator pump may be driven by direct mechanical power from the rotor 103. The DC power operates banks of electrolytic cells 123 which use the fresh water product of desalination to produce hydrogen and oxygen. The electrolytic cells 123 require a constant voltage, depending on the design, but can accept wide current ranges simply by producing more or less gas product. Therefore the DC current driving the electrolytic cells can vary as the wind varies with no loss in conversion efficiency. The hydrogen may be sent to gaseous storage 105 where it may be used to later generate electricity 109 via a fuel cell to put back on the grid or other electrical use 113 when the wind has subsided or the hydrogen may be transported and used directly 115. The hydrogen may also be sent to a cryogenic plant 107 where it is cooled, compressed and liquefied. This liquid hydrogen is then stored to be used for some later cryogenic hydrogen use 117. Both the gaseous and liquid hydrogen can be shipped and used in the marketplace.

Figure 23:
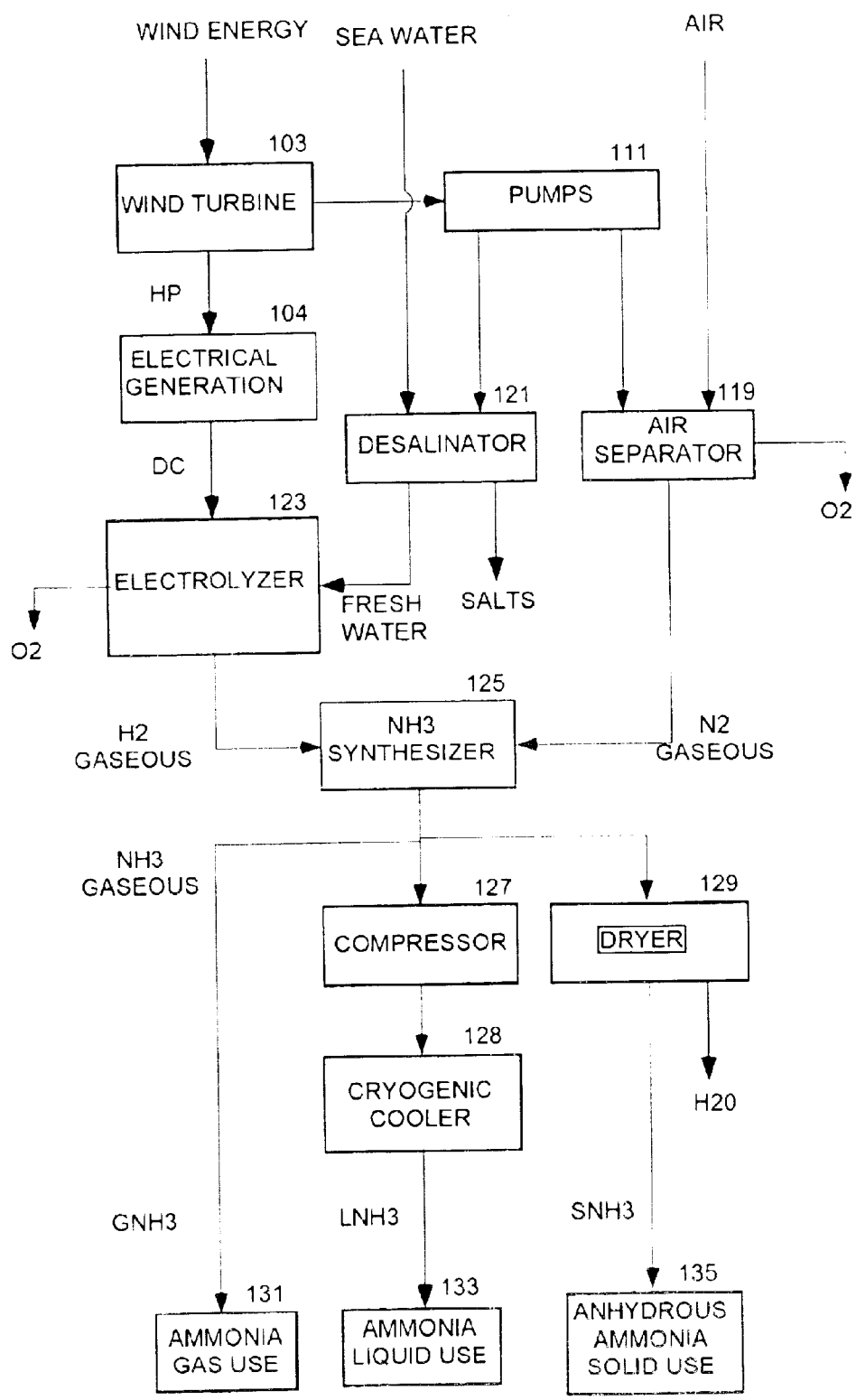
FIG. 23 is a flow chart describing the process for generating anhydrous ammonia gas, liquid, and solid at sea.

FIG. 23 shows a flow chart describing the process for generating hydrogen products based on ammonia at sea. Wind energy is captured and turned into rotating mechanical power by the wind turbine rotor 103. The mechanical power is used for DC electrical generation 104, and to power pumps 111 associated with a desalinator 121 and an air separator 119. These pumps 111 may optionally be powered by DC power. The desalinator 121 creates fresh water from sea water optionally by reverse osmosis. Salt or waste water with increased saltiness is the byproduct of the desalinator 121. The fresh water from the desalinator 121 is used in an electrolyzer 123 along with DC power from the wind turbine to produce pure hydrogen and oxygen gas. The oxygen may be released as a byproduct and the hydrogen retained and sent to an ammonia synthesizer 125 or 'burner'. An air separator 119 is employed to remove nitrogen gas from the air; oxygen and other trace gasses are released as a byproduct. Separation of nitrogen gas from air is well known and equipment for performing this task is commercially available. The nitrogen gas is combined with the hydrogen gas in the burner 125 and ammonia and water are synthesized. Synthesis of ammonia from hydrogen and nitrogen gas is well known and equipment for performing this task is commercially available. The ammonia may be stored, transported, and used as a gas 131 or it may go through a compressor 127 and cooler 128 and stored as pure liquid ammonia 133. The ammonia can also be dried in a separator 129 to form a solid form, anhydrous ammonia 135. This solid form of ammonia 135 is most easily stored and shipped to markets. After being transported, the anhydrous ammonia can be re-separated to form gaseous hydrogen and gaseous nitrogen. It can also be directly used as a fertilizer. The final product of this process, whether gaseous ammonia, liquid ammonia, or solid anhydrous ammonia, represents a "green" product that can be sold in a specialized market for a premium price.

There are two processes for producing methane gas using wind power. In both processes sea water is first desalinated or distilled to fresh water. Electrolysis of the water gives pure hydrogen. In the first process illustrated in FIG. 24 carbon dioxide is generated from terrestrial carbonates. In a second process illustrated in FIG. 25 carbon dioxide is removed from the air or sea water as a gas. In both process the hydrogen and carbon dioxide are then combined to produce methane.

Producing methane by either of these methods has an overall process efficiency of about 50%, which is on the same order as producing grid quality electricity from wind turbines, and far better than other competing large energy storage approaches such as batteries.

Figure 24:
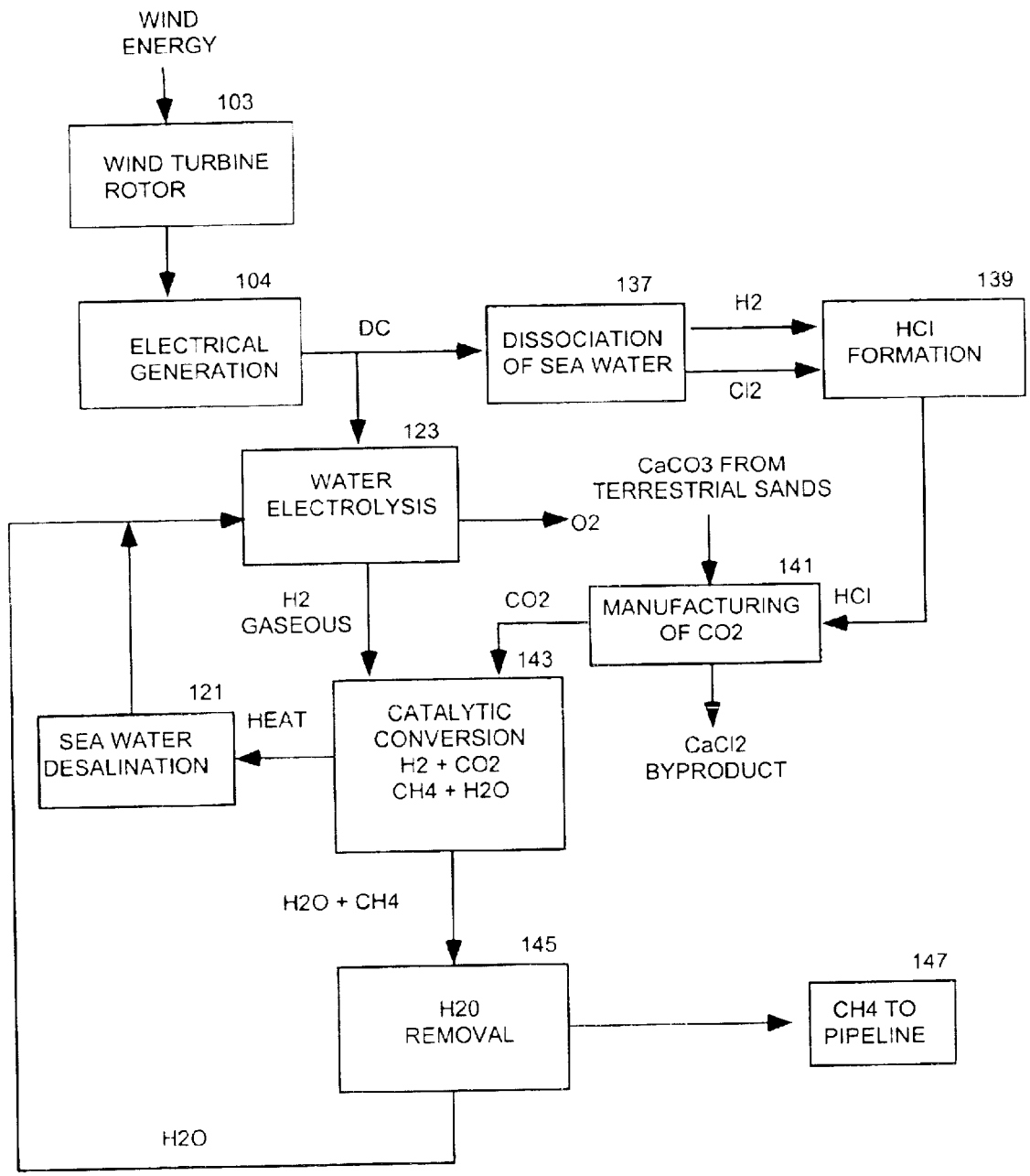
FIG. 24 is a flow chart describing the process for generating methane gas using wind energy and solid calcium carbonate.

FIG. 24 is a flow chart describing a process for using wind power and terrestrial carbonates to generate methane gas suitable for injection into existing natural gas distribution pipelines. Wind power is captured and turned into rotating mechanical power by the wind turbine rotor 103. The mechanical power is used for DC electrical generation 104. The DC electricity is used, as in other embodiments, to produce hydrogen in an electrolyzer 123 from fresh water with oxygen released as a byproduct. DC electricity may also be used to dissociate sea water 137 releasing hydrogen and chlorine gas. The technique of dissociation of sea water is well known and equipment is commercially available for accomplishing this task. The hydrogen and chlorine gas from dissociated sea water are simply combined in a plenum to produce hydrochloric acid 139. The hydrochloric acid is then combined with calcium carbonate 141 releasing carbon dioxide with calcium chloride as a byproduct. The calcium carbonate used in step 141 is transported to the offshore windship or factory ship from a terrestrial source. Alternatively, in a second method not shown, the whole process of producing hydrochloric acid is eliminated and the calcium carbonate is simply heated in the presence of air using waste heat or electricity which also releases carbon dioxide and leaves calcium oxide as a byproduct. It should also be noted that it is also possible to obtain calcium carbonate by processing and purifying it out of the salt byproduct of the water purification process 121. In both methods, hydrogen gas and carbon dioxide gas are combined in a catalytic reactor 143 to produce methane and water vapor. The catalytic reaction of hydrogen and carbon dioxide into methane and water vapor is well known and equipment is commercially available for achieving this task. Waste heat from this process may be uses to desalinate sea water 121 by a process such as distillation. Finally the water is removed from the methane 145 and the methane may be sent into a natural gas pipeline 147, or this methane can be compressed or even liquefied for storage and shipment. The water removed from the methane may be recycled and used in the electrolyzer 123. The methane created from this process is a "green" product and may be sold at a premium price.

By-products of the first method of liberating carbon dioxide from calcium carbonate are calcium chloride and sodium hydroxide, both of which are toxic and caustic and require proper disposal efforts. The by-product of the second process is calcium oxide, a benign salt for which there are numerous markets at present. The first method is theoretically more efficient than the second method.

It should be noted that since the calcium carbonate is a mined product the burning of natural gas produced as described in FIG. 24 does add carbon to the atmosphere. Even though the energy to synthesize the methane is renewable the end product is not 100% renewable.

Figure 25:
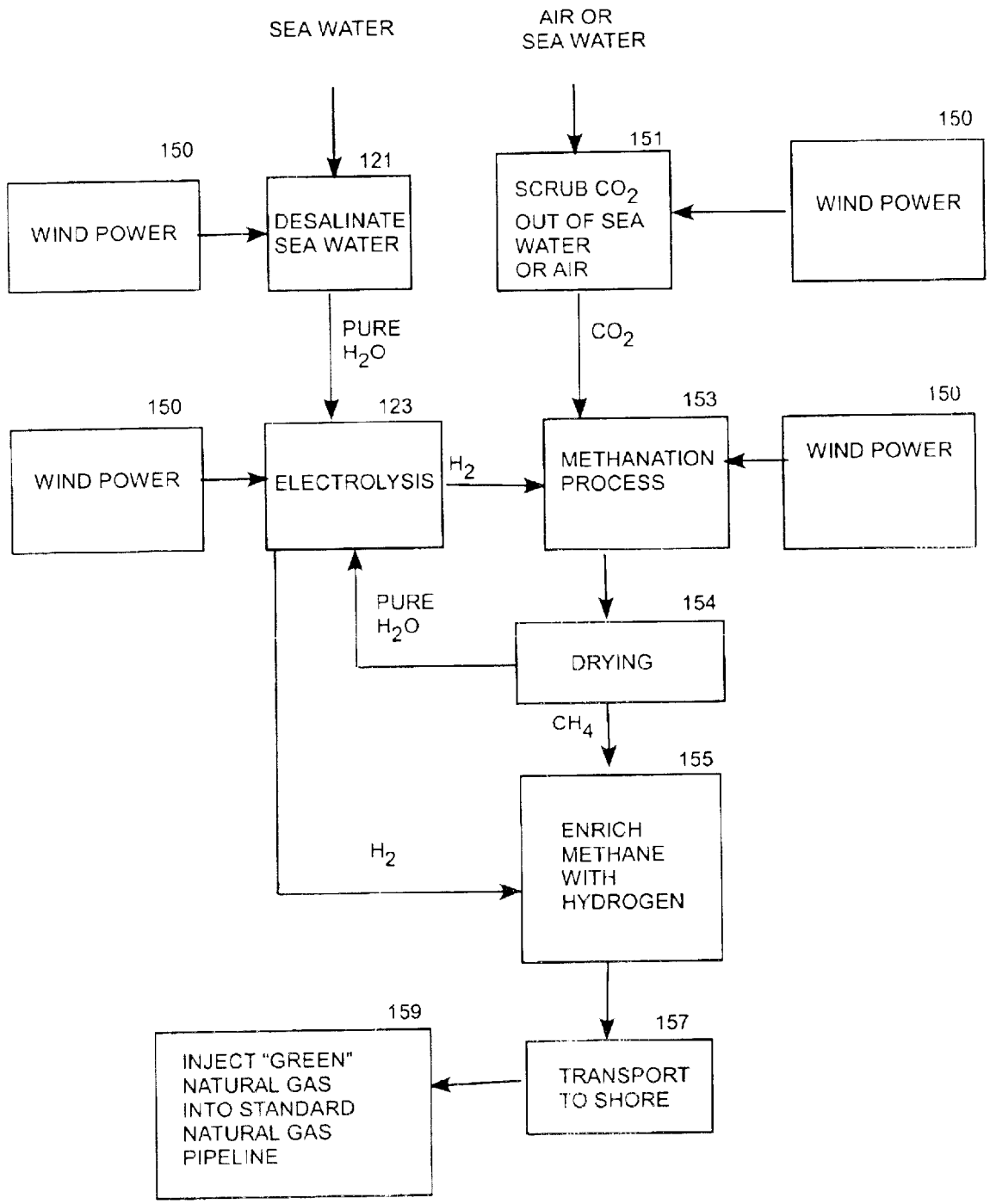
FIG. 25 is a flow chart describing the process for generating renewable methane gas.

FIG. 25 is a flow chart describing the process for generating renewable methane or "green gas" at sea using wind power. A windship provides wind power 150, either mechanical or electrical for a variety of purposes. Sea water is desalinated 121 and the pure water is used to make hydrogen by electrolysis 123.

Carbon dioxide is dissolved as a gas in seawater at the same partial pressure as in the earth's atmosphere. In some ocean currents, because of their salinity and temperature, more CO2 is dissolved than in the atmosphere and thus the amount of CO2 gas dissolved in sea water varies between 35 and 60 ml/l depending on the temperature and salinity. It is straightforward to reclaim this CO2 by pumping large volumes of plain sea water through plenums, releasing the gasses by vacuum and simply collecting the CO2 gas with catalytic separators 151 just as is normally done by pollution control equipment at fossil fuel power plants. Alternatively atmospheric air is scrubbed 151 for carbon dioxide. By either method, pure carbon dioxide is recovered.

Hydrogen and carbon dioxide are fed in carefully metered quantities into a methanator 153, where wind generated electricity 150 will be used to prepare methane, CH4. The process used to prepare methane is optionally the Sabatier Methanation Process. The methane is then dried 154 to remove water. This pure water may be re-used in the electrolyzer 123. A small amount of hydrogen gas may then be added to the methane 155 since methane enriched with a very small amount of hydrogen is the fuel equivalent of the best of the natural gases and totally free from undesirable contaminants. The most striking advantage of using this approach to reclaim carbon dioxide is that the carbon so reclaimed is coming out of the atmospheric balance. In other words, the carbon reclaimed in this manner is coming from the polluting by-products of fossil fuel power plants the world over and being recycled, so no new carbon is released into the atmosphere. The green gas is then transported to shore 157 either by pipeline or ship. The green gas can be fed into an existing gas distribution system 159 and consumed as a renewable energy product. The carbon used to make green gas comes out of and back into the natural carbon cycle of the earth, and the energy used, electricity from wind power (a form of solar energy) comes out of and degrades back into the natural solar energy cycle. The desalinator 121, electrolyzer 123, gas extractor, scrubbers 151, and methantor 153 are all equipment currently used by industry, and the components are commercially available.

This green gas process, will be especially valuable to countries like Great Britain and Norway where North Sea natural gas has become their preferred energy source. The gas resource is depleting rapidly, and the wind resource over the North Sea is very rich.

The process described in FIG. 25 is similar to that in FIG. 24 except that the carbon dioxide gas is obtained directly from the air or from sea water in a pump/plenum chamber. The scrubber 151 uses the similar equipment to that in wide use for stack emission control. The carbon thus obtained does not add to the worldwide carbon dioxide greenhouse gas in the atmosphere. The methane thus obtained is a completely renewable, sustainable fuel. The carbon dioxide and hydrogen gas can be combined in controlled quantities using a methanation process 153 to create the methane gas. The resulting natural gas is a "green" product that can be sold at a premium price in "green power" markets. The natural gas can be sold into the conventional natural market gas and "green tags" can be separated from the gas (nothing is physically separated from the gas, but from a commercial standpoint the environmental attributes are removed and sold separately). The green tags represent the environmental attributes associated with a certain quantity of energy. They are tradable and there is currently a market for green tags through organizations such as the Bonneville Environmental Foundation. As the effects of global warming increase it is expected that the market for green power and green tags will also increase. Efforts to reduce global warming may also create a market for carbon dioxide credits. Since this system removes carbon dioxide from the atmosphere to make natural gas it avoids the release of new carbon into the atmosphere by replacing fossil natural gas. There may be carbon sequestration credits available from the production of natural gas by this method. It is anticipated that these carbon sequestration credits may become a tradable commodity in the future. Electrolytic hydrogen, carbon dioxide, and electricity can also be used in a synthesizer to yield methanol, a very useful liquid fuel. Again, this would be a "green" fuel because the carbon dioxide would be scrubbed out of the air or out of seawater using renewable energy. The resultant methanol fuel would contain a considerable amount of water which can be removed using a process developed by Mobil Oil. The methanol is dehydrated and has water removed and the resulting product is high octane gasoline that can be sold as a "green fuel" for internal combustion engines.

Another process considered is to convert the calcium carbonate to carbide, then produce acetylene using wind generated hydrogen gas. The acetylene is another useful product in the marketplace, but does not have the universal appeal of methane for direct gas pipeline replenishment. This is an example of another energy intensive product that could be produced on windships. There are many such examples and this disclosure should in no way limit the range of energy intensive products produced at sea by windships.

The production of hydrogen, anhydrous ammonia, methane, natural gas, acetylene, high octane gasoline, and/or other products may occur at the base of the tower or in the semi-submersible hull of each windship. Alternatively, the wind power from each windship may be transmitted to a central factory ship that is surrounded by a flotilla of windships. Production of value added products may take place on the factory ship and the products may then be transported to shore by ship or pipeline. If calcium carbonate or other terrestrial products are to be used, they must be shipped out to the factory ship or windships. It is also possible that intermediate stages of processing may occur at the base of each windship and that the remaining processing can occur on a central factory ship. For instance, sea water may be desalinated and electrolyzed at the base of each windship to create hydrogen. The hydrogen can then be transported to a central factory ship where it is further processed to create methane, ammonia, or some other product that is transported to shore for sale.

In the foregoing disclosure, the physical setting for the production of renewable natural gas and other hydrogen based products has been at sea. These processes are considered to be highly compatible with the semi-submersible hulls and other aspects of the windships described herein, but the description of these processes taking place at sea should in no way limit the scope of the invention to offshore activities. To the contrary it is intended that these hydrogen based products could and should be produced on land by power from vertical array wind turbines or from conventional, prior art, commercially available wind turbines. One good example is that a wind farm could be located where there is no suitable electrical transmission line but the wind resource is plentiful and access to a natural gas pipeline is convenient. Green gas could then be produced and introduced into the pipeline and sold and the 'green tags' could also be sold. Other examples can also be conceived such as an onshore desalinization plant or a fertilizer plant powered by terrestrial wind turbines, most likely in situations where the wind resource is good, but there are not adequate electrical transmission lines, and a there is a local market for the product produced.

Another potentially valuable product that can be created using the energy that the offshore wind turbine of the present invention generates is desalinated sea water. Almost 12 percent of potable water consumed today is desalinated sea water. By using the energy from offshore wind turbines to desalinate the seawater, the resultant product is again a value-added "green" product.

While embodiments of the invention have been shown and described, it will be apparent to those skilled in the art that various modifications may be made in these embodiments without departing from the scope of the invention. Therefore, it is intended that the invention not necessarily be limited to the particular embodiments described and illustrated herein.

What is claimed is:

1. An offshore wind turbine comprising:
   a buoyant hull,
   an anchor securing said buoyant hull at a predetermined location,
   a tower extending upwardly from said buoyant hull, and
   a plurality of wind turbine rotors attached to said tower wherein at least two of said wind turbine rotors are controlled to modulate the aerodynamic forces thereon whereby said at least two wind turbine rotors can be used to provide a yawing moment to said wind turbine.

2. The wind turbine of claim 1 wherein said at least two wind turbine rotors are at the same height as each other and are located at a position further away from said tower than others of said plurality of wind turbine rotors.

3. The wind turbine of claim 1 further comprising a yaw controller that measures an angular differential between the orientation of said wind turbine rotors and the wind direction and controls said at least two wind turbine rotors to yaw said wind turbine in a direction that decreases said angular differential.

* * * * *